United States Patent

Ito et al.

[11] Patent Number: 5,889,894
[45] Date of Patent: Mar. 30, 1999

[54] INTERPOLATING OPERATION METHOD AND APPARATUS FOR IMAGE SIGNALS

[75] Inventors: Wataru Ito; Tatsuya Aoyama, both of Kanagawa-ken, Japan

[73] Assignee: Fuji Photo Film Co., Ltd., Kanagawa-ken, Japan

[21] Appl. No.: 81,100

[22] Filed: May 19, 1998

Related U.S. Application Data

[62] Division of Ser. No. 679,830, Jul. 15, 1996.

[30] Foreign Application Priority Data

| Jul. 13, 1995 | [JP] | Japan | 7-177007 |
| Aug. 8, 1995 | [JP] | Japan | 7-202400 |
| Dec. 25, 1995 | [JP] | Japan | 7-337570 |

[51] Int. Cl.$^6$ ............................. G06K 9/32; G06K 9/40
[52] U.S. Cl. ..................... 382/300; 382/261; 382/298; 382/299; 358/428; 358/515
[58] Field of Search ..................... 382/261, 298, 382/300, 128, 130, 132, 299; 358/428, 515

[56] References Cited

U.S. PATENT DOCUMENTS

| 5,048,105 | 9/1991 | Adachi | 382/300 |
| 5,054,100 | 10/1991 | Tai | 382/300 |
| 5,294,998 | 3/1994 | Piovoso et al. | 382/261 |
| 5,774,601 | 6/1998 | Mahmoodi | 382/298 |

FOREIGN PATENT DOCUMENTS

| 0 232 081 A2 | 8/1987 | European Pat. Off. | G06F 15/62 |
| 0 571 026 A2 | 11/1993 | European Pat. Off. | G06F 15/62 |

*Primary Examiner*—Bipin Shalwala
*Assistant Examiner*—Daniel G. Mariam
*Attorney, Agent, or Firm*—Sughrue, Mion, Zinn, Macpeak & Seas, PLLC

[57] ABSTRACT

An original image signal, which represents an original image and is made up of a series of original image signal components Yij, is obtained. Corresponding interpolation coefficients Bij and Cij, which are set for each of the original image signal components Yij, in two different interpolating functions f and g, represented by Formulas (1) and (2), for obtaining two interpolation images having different levels of sharpness are linearly combined with each other by using Formula (3). A new interpolation coefficient Aij is thereby obtained. An interpolating operation is carried out on the original image signal components Yij with an interpolating function h, which has the new interpolation coefficient Aij and is represented by Formula (4). An interpolation image signal is thereby obtained, which is made up of a series of image signal components occurring at intervals different from those of the original image signal components Yij, $f = \Sigma Bij \cdot Yij$ (1)

$g = \Sigma Cij \cdot Yij$ (2)

$Aij = (1-\alpha)Bij + \alpha Cij$ (3)

$h = \Sigma Aij \cdot Yij$ (4)

in which $i=1, 2, \ldots,$ and $j=1, 2, \ldots,$
The coefficient $\alpha$ in Formula (3) is set to be one of real numbers including a range smaller than 0 and/or a range larger than 1.

33 Claims, 10 Drawing Sheets

F I G.2
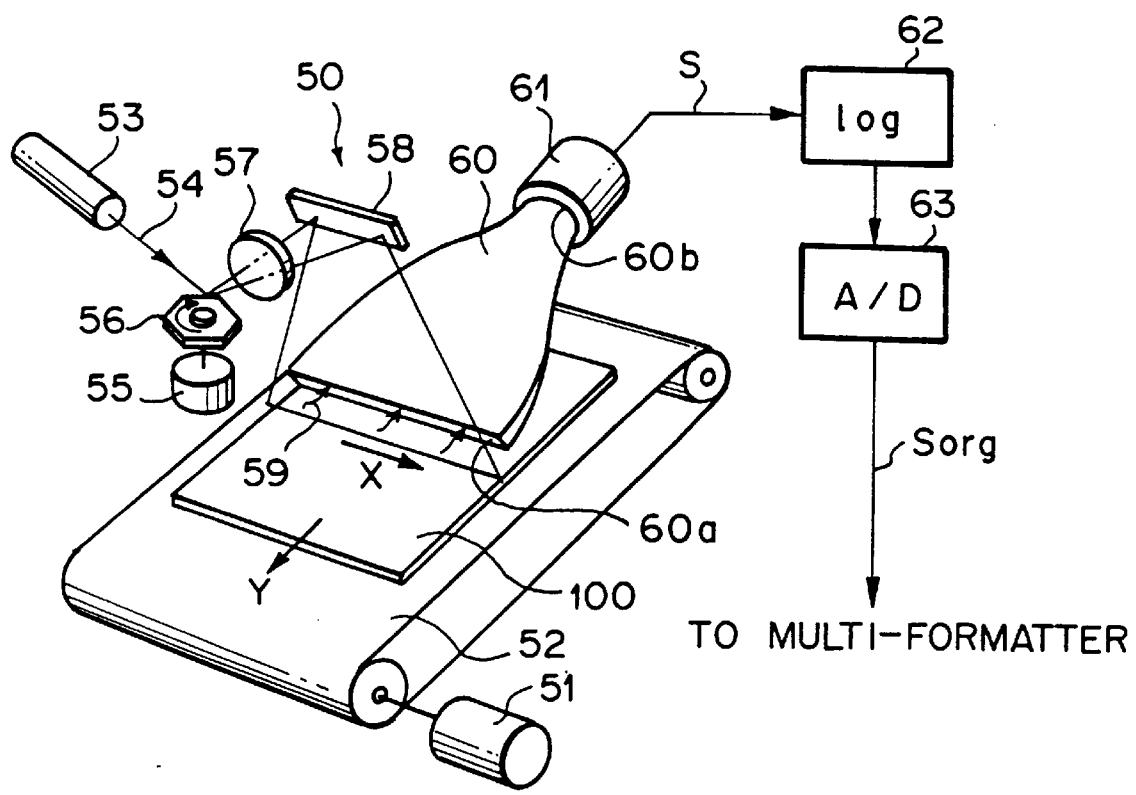

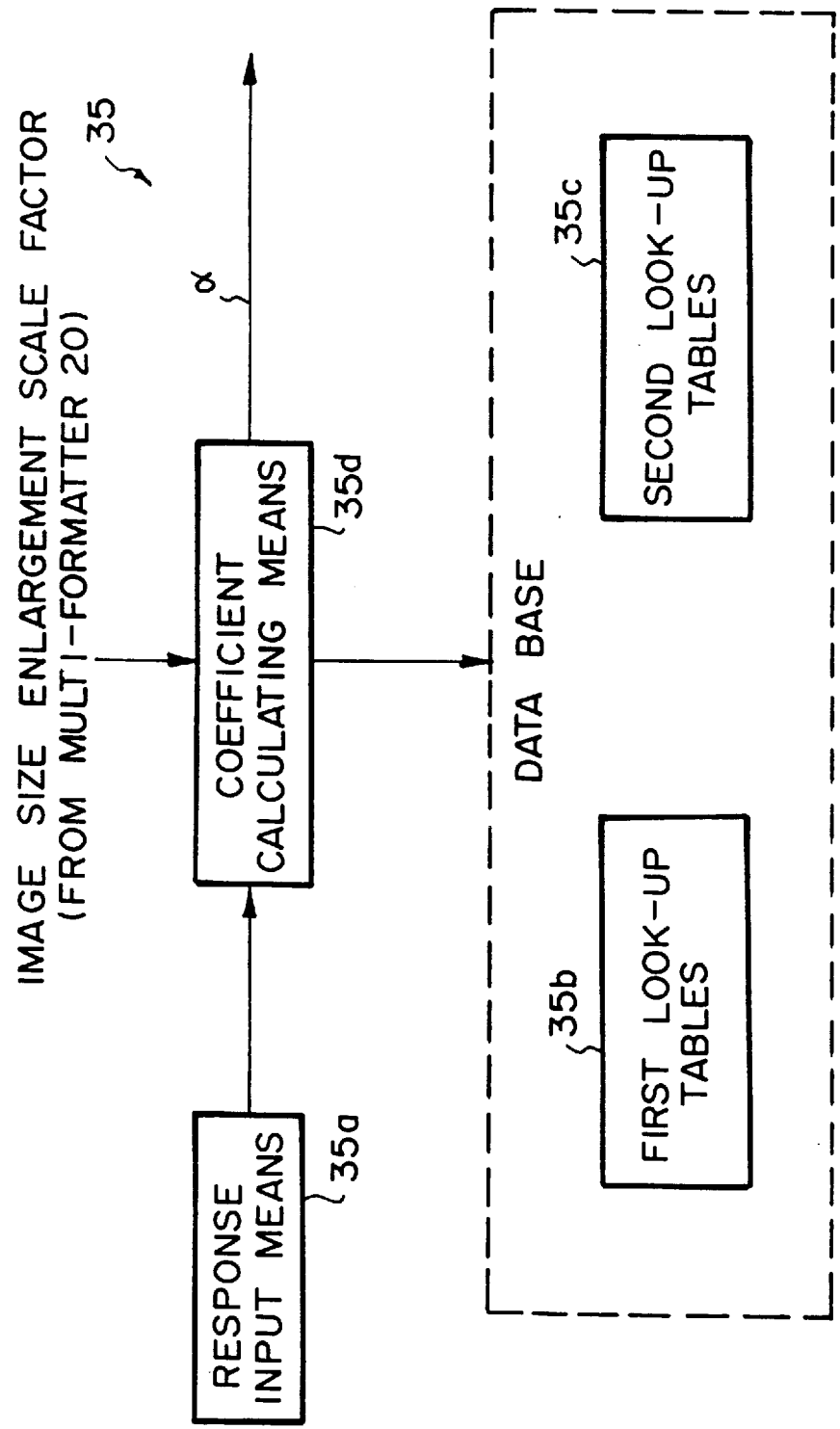

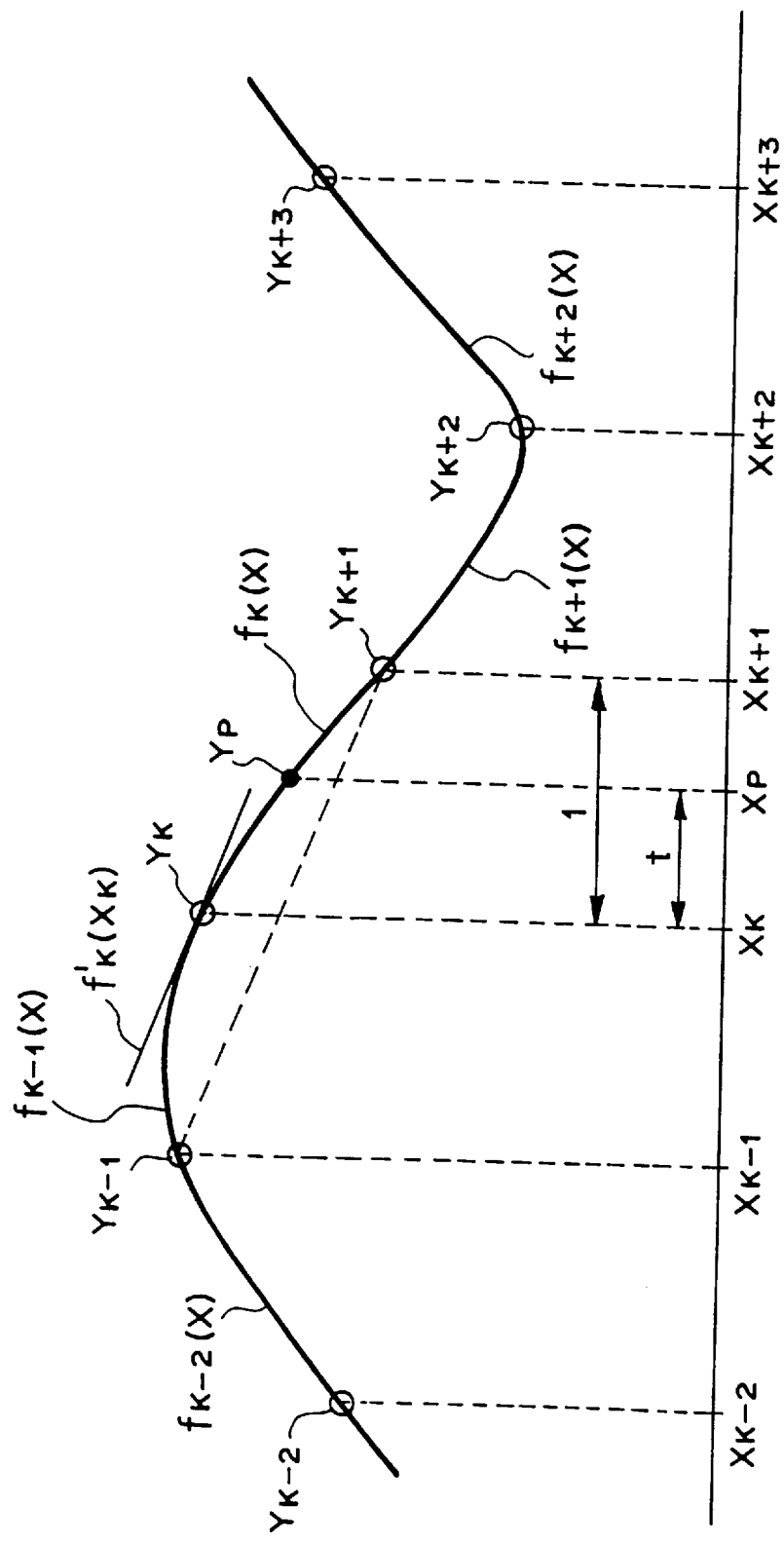

FIRST LOOK-UP TABLE

SECOND LOOK-UP TABLE

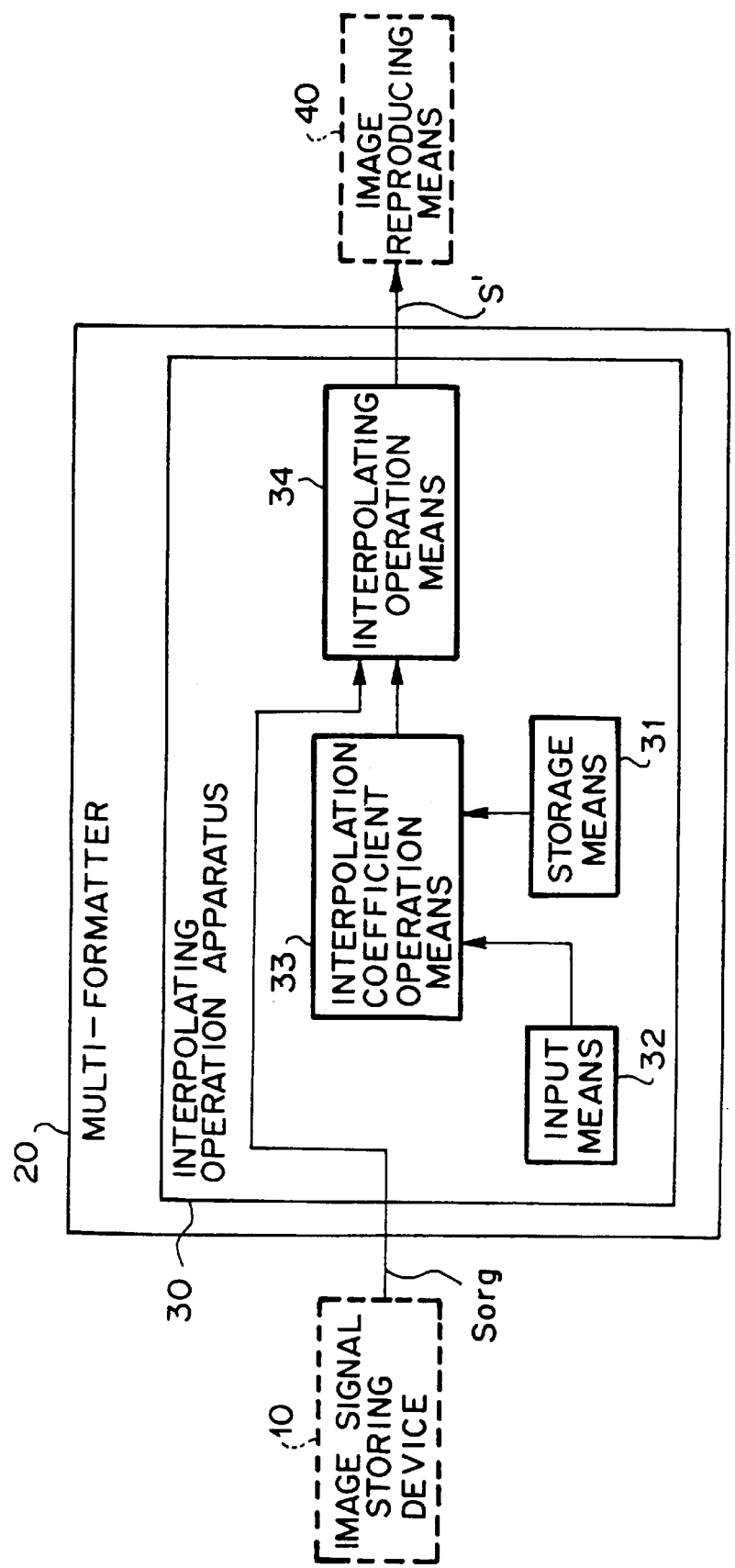

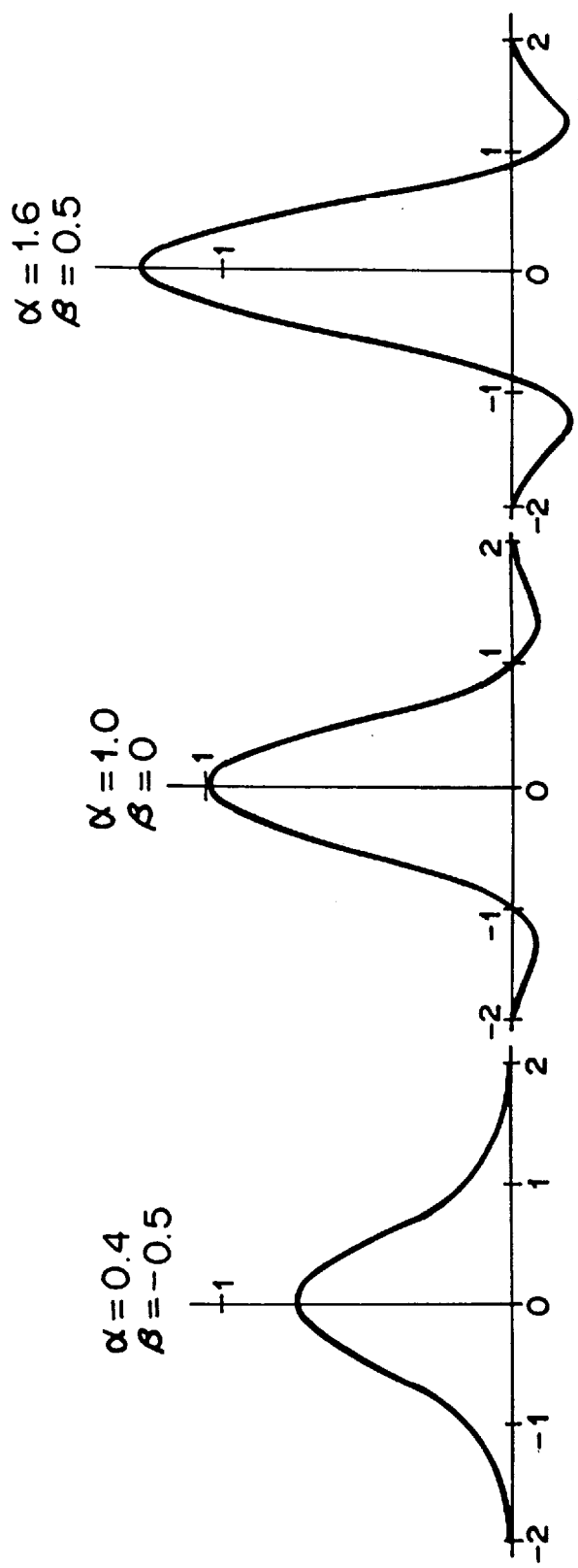

INTERPOLATING OPERATION METHOD AND APPARATUS FOR IMAGE SIGNALS

This is a divisional of application Ser. No. 08/679,830 filed Jul. 15, 1996.

BACKGROUND OF THE INVENTION

1. Field of the Invention

This invention relates to an interpolating operation method and apparatus for an image signal.

2. Description of the Prior Art

Techniques for photoelectrically reading out an image, which has been recorded on a photographic film, in order to obtain an image signal, carrying out appropriate image processing on the image signal, and then reproducing a visible image by use of the processed image signal have heretofore been known in various fields.

Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material, such as photographic material, or on a display device, such as a cathode ray tube (CRT) display device. Radiation image recording and reproducing systems, which use stimulable phosphor sheets, are advantageous over conventional radiography using silver halide photographic materials, in that images can be recorded even when the energy intensity of the radiation, to which the stimulable phosphor sheet is exposed, varies over a wide range.

In image recording and reproducing systems, in which an image signal is obtained in the manner described above and a visible is reproduced from the image signal, in cases where the region of interest in the visible image is to be viewed in more detail, the region of interest is often enlarged and reproduced. In such cases, if the enlargement of the image size is carried out such that the number of the image signal components of the image signal representing the enlarged image may be identical with the number of the image signal components of the original image signal representing the original image, the sharpness of the enlarged image will be recognized to be lower than the sharpness of the original image due to the visual characteristics of persons. Therefore, if the image is merely enlarged and reproduced, an enlarged image having a high sharpness cannot be obtained, and the details of the image cannot be viewed accurately.

In order for the aforesaid problems to be eliminated, a predetermined interpolating operation may be carried out on the original image signal, which has been obtained by reading out an original image, and an interpolation image signal, which is a secondary image signal and is made up of a number of image signal components different from that of the original image signal, may thereby be formed. Specifically, in cases where an enlarged image is to be reproduced, an interpolation image signal, which is made up of a number of image signal components larger than that of the original image signal, may be formed from the interpolating operation. A visible image may then be reproduced from the interpolation image signal. In this manner, the sharpness of the enlarged image can be prevented from becoming low.

As the interpolating operation methods for carrying out interpolating operations on image signals, various methods have heretofore been proposed. Among such methods, the method using third-order spline interpolating functions is popular. With the interpolating operation method using the third-order spline interpolating functions, digital original image signal components ($Y_k$) in each section are connected by a third-order function ($f_k$), and the value of $f_k$ corresponding to a position, at which an interpolation point is set, (i.e., a setting position in each section) is taken as the value of the interpolated image signal component.

The interpolating operations, which pass through the original image signal in the manner described above, can yield an image having a comparatively high sharpness. As such interpolating operations, cubic spline interpolating operations, and the like, are known. How the cubic spline interpolating operations are carried out will be described hereinbelow.

FIG. 4 is an explanatory graph showing how interpolated image signal components are obtained with a conventional cubic spline interpolating operation from original image signal components, which are sampled with a period of an equal interval and represent sampling points (picture elements) arrayed in one direction. As illustrated in FIG. 4, the image signal components (the original image signal components), which have been detected as digital signal components from an original image and represent a series of picture elements $X_{k-2}$, $X_{k-1}$, $X_k$, $X_{k+1}$, $X_{k+2}$, . . . , are respectively represented by $Y_{k-2}$, $Y_{k-1}$, $Y_k$, $Y_{k+1}$, $Y_{k+2}$, . . . . A third-order spline interpolating function is set for each of sections $X_{k-2} \sim X_{k-1}$, $X_{k-1} \sim X_k$, $X_k \sim X_{k+1}$, and $X_{k+1} \sim X_{k+2}$. The spline interpolating functions corresponding to the respective sections are represented by $f_{k-2}$, $f_{k-1}$, $f_k$, $f_{k+1}$, and $f_{k+2}$. The interpolating functions are the third-order functions, in which the position in each section serves as a variable.

Firstly, how the interpolating operation is carried out when a point taken for interpolation (hereinbelow referred to as the interpolation point) $X_p$ falls within the section $X_k \sim X_{k+1}$ will be described hereinbelow. The spline interpolating function $f_k$ corresponding to the section $X_k \sim X_{k+1}$ is represented by Formula (29).

$$f_k(x) = A_k x^3 + B_k x^2 + C_k x + D_k \tag{29}$$

In the cubic spline interpolating operation, it is necessary that the spline interpolating function $f_k$ passes through the original sampling points (picture elements), and that the first-order differential coefficient of the spline interpolating function $f_k$ is continuous between adjacent sections. Therefore, it is necessary for Formulas (7), (8), (9), and (10) to be satisfied.

$$f_k(X_k) = Y_k \tag{7}$$

$$f_k(X_{k+1}) = Y_{k+1} \tag{8}$$

$$f_k'(X_k) = f_{k-1}'(X_k) \tag{9}$$

$$f_k'(X_{k+1}) = f_{k+1}'(X_{k+1}) \tag{10}$$

In these formulas, $f_k'$ represents the first-order differentiation ($3A_k x^2 + 2B_k x + C_k$) of the function $f_k$.

In the strict sense, the cubic spline interpolating operation contains the continuity conditions of the second-order differential coefficient. However, with continuity conditions of the second-order differential coefficient, the operation formulas become complicated. Therefore, the cubic spline interpolating operation is popularly carried out in the form simplified in the manner described above.

Also, in the cubic spline interpolating operation, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Y_{k+1}-Y_{k-1})/(X_{k+1}-X_{k-1})$ of the image signal components $Y_{k-1}$ and $Y_{k+1}$ representing the picture elements $X_{k-1}$ and $X_{k+1}$. Therefore, it is necessary for Formula (19) to be satisfied.

$$f_k'(X_k)=(Y_{k+1}-Y_{k-1})/(X_{k+1}-X_{k-1}) \quad (19)$$

Also, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Y_{k+2}-Y_k)/(X_{k+2}-X_k)$ of the image signal components $Y_k$ and $Y_{k+2}$ representing the picture elements $X_k$ and $X_{k+2}$. Therefore, it is necessary for Formula (20) to be satisfied.

$$f_k'(X_{k+1})=(Y_{k+2}-Y_k)/(X_{k+2}-X_k) \quad (20)$$

It is herein assumed that the interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is equal to 1, and the position of the interpolation point $X_p$, which is taken from the picture element $X_k$ toward the picture element $X_{k+1}$, is represented by t ($0 \leq t \leq 1$). In such cases, from Formulas (29), (7), (8), (9), (10), (19), and (29), the formulas shown below obtain.

$$f_k(0)=D_k=Y_k$$

$$f_k(1)=A_k+B_k+C_k+D_k=Y_{k+1}$$

$$f_k'(0)=C_k=(Y_{k+1}-Y_{k-1})/2$$

$$f_k'(1)=3A_k+2B_k+C_k=(Y_{k+2}-Y_k)/2$$

Therefore, the formulas shown below obtain.

$$A_k=(Y_{k+2}-3Y_{k+1}+3Y_k-Y_{k-1})/2$$

$$B_k=(-Y_{k+2}+4Y_{k+1}-5Y_k+2Y_{k-1})/2$$

$$C_k=(Y_{k+1}-Y_{k-1})/2$$

$$D_k=Y_k$$

As described above, the variable conversion of X=t is carried out, and therefore the spline interpolating function $f_k(X)$ is represented by the formula shown below.

$$f_k(x)=f_k(t)$$

Therefore, an interpolated image signal component $Y_p$ corresponding to the interpolation point $X_p$ may be represented by Formula (30).

$$Y_p=f_k(t)=A_kt^3+B_kt^2+C_kt+D_k \quad (30)$$

Substituting the coefficients $A_k$, $B_k$, $C_k$, and $D_k$ into Formula (30) yields $$Y_p = \{(Y_{k+2} - 3Y_{k+1} + 3Y_k - Y_{k-1})/2\}t^3 +$$

$$\{(-Y_{k+2} + 4Y_{k+1} - 5Y_k + 2Y_{k-1})/2\}t^2 + \{(Y_{k+1} - Y_{k-1})/2\}t + Y_k$$

Arranging this formula with respect to the image signal components $Y_{k-1}$, $Y_k$, $Y_{k+1}$, and $Y_{k+2}$ yields Formula (31).

$$Y_p = \{(-t^3 + 2t^2 - t)/2\}Y_{k-1} + \quad (31)$$

$$\{(3t^3 - 5t^2 + 2)/2\}Y_k + \{(-3t^3 + 4t^2 + t)/2\}Y_{k+1} + \{(t^3 - t^2)/2\}Y_{k+2}$$

The coefficients for the image signal components $Y_{k-1}$, $Y_k$, $Y_{k+1}$, and $Y_{k+2}$ are referred to as the interpolation coefficients $C_{k-1}$, $C_k$, $C_{k+1}$, and $C_{k+2}$. Specifically, the interpolation coefficients $C_{k-1}$, $C_k$, $C_{k+1}$, and $C_{k+2}$, which respectively correspond to the image signal components $Y_{k-1}$, $Y_k$, $Y_{k+1}$, and $Y_{k+2}$ in Formula (31), may be represented by the formulas shown below.

$$C_{k-1}=(-t^3+2t^2-t)/2$$

$$C_k=(3t^3-5t^2+2)/2$$

$$C_{k+1}=(-3t^3+4t^2+t)/2$$

$$C_{k+2}=(t^3-t^2)/2$$

The operations described above are repeated for the sections $X_{k-2} \sim X_{k-1}$, $X_{k-1} \sim X_k$, $X_k \sim X_{k+1}$, and $X_{k+1} \sim X_{k+2}$. In this manner, an interpolation image signal can be obtained, which is made up of image signal components occurring at intervals different from those of the image signal components of the entire original image signal.

As described above, in the cubic spline interpolating operation, it is necessary that the spline interpolating function passes through the original sampling points (picture elements), and that the first-order differential coefficient of the spline interpolating function is continuous between adjacent sections. With the interpolating function for the cubic spline interpolating operation, the interpolation image signal for use in the reproduction of a secondary image (i.e., the image obtained from the interpolating operation), which has a comparatively high sharpness, is obtained. On the other hand, as for a portion in the original image, at which the change in density is gentle, the interpolating operation should preferably be carried out such that a secondary image, in which the sharpness is comparatively low and which is smooth, may be obtained. As the interpolating function for obtaining the interpolation image signal representing the secondary image, in which the sharpness is comparatively low and which is smooth, for example, a B spline interpolating operation function is known. In the B spline interpolating operation, the spline interpolating function need not pass through the original sampling points (picture elements), and it is necessary that the first-order differential coefficient and the second-order differential coefficient {represented by f" (X)} of the spline interpolating function are continuous between adjacent sections.

Specifically, in Formula (29), $$f_k'(X)=A_kX^3+B_kX^2+C_kX+D_k \quad (29)$$

the conditions shown below should be satisfied.

$$f_k'(X_k)=f_{k-1}'(X_k) \quad (9)$$

$$f_k'(X_{k+1})=f_{k+1}'(X_{k+1}) \quad (10)$$

$$f_k''(X_k)=f_{k-1}''(X_k) \quad (32)$$

$$f_k''(X_{k+1})=f_{k+1}''(X_{k+1}) \quad (33)$$

Also, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Y_{k+1}-Y_{k-1})/(X_{k+1}-X_{k-1})$ of the image signal components $Y_{k-1}$ and $Y_{k+1}$ representing the picture elements $X_{k-1}$ and $X_{k+1}$. Therefore, it is necessary for Formula (19) to be satisfied.

$$f_k'(X_k)=(Y_{k+1}-Y_{k-1})/(X_{k+1}-X_{k-1}) \quad (19)$$

Further, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Y_{k+2}-Y_k)/(X_{k+2}-X_k)$ of the image signal components $Y_k$ and $Y_{k+2}$ representing the picture elements $X_k$ and $X_{k+2}$. Therefore, it is necessary for Formula (20) to be satisfied.

$$f_k'(X_{k+1})=(Y_{k+2}-Y_k)/(X_{k+2}-X_k) \quad (20)$$

In general, the function f(X) may be approximately represented by Formula (34).

$$f(X)=f(0)+f'(0)X+\{f''(0)/2\}X^2 \quad (34)$$

It is herein assumed that the interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is equal to 1, and the position of the interpolation point $X_p$, which is taken from the picture element $X_k$ toward the picture element $X_{k+1}$, is represented by t ($0 \leq t \leq 1$). In such cases, from Formulas (29), (9), (10), (19), (20), (30), (32), (33), and (34), the formulas shown below obtain.

$$f_k'(0)=C_k=(Y_{k+1}-Y_{k-1})/2$$

$$f_k'(1)=3A_k+2B_k+C_k=(Y_{k+2}-Y_k)/2$$

$$f_k''(0)=Y_{k+1}-2Y_k+Y_{k-1}=2B$$

Therefore, the formulas shown below obtain.

$$A_k=(Y_{k+2}-3Y_{k+1}+3Y_k-Y_{k-1})/6$$

$$B_k=(Y_{k+1}-2Y_k+Y_{k-1})/2$$

$$C_k=(Y_{k+1}-Y_{k-1})/2$$

Since $D_k$ is unknown, it is represented by the formula $$D_k=(D_1Y_{k+2}+D_2Y_{k+1}+D_3Y_k+D_4Y_{k-1})/6$$

As described above, the variable conversion of X=t is carried out, and therefore the spline interpolating function $f_k(X)$ is represented by the formula shown below.

$$f_k(X)=f_k(t)$$

Therefore, $$f_k(t) = \{(Y_{k+2} - 3Y_{k+1} + 3Y_k - Y_{k-1})/6\}t^3 + \{(Y_{k+1} - 2Y_k + Y_{k-1})/2\}t^2 +$$

$$\{(Y_{k+1} - Y_{k-1})/2\}t + (D_1Y_{k+2} + D_2Y_{k+1} + D_3Y_k + D_4Y_{k-1})/6$$

Arranging this formula with respect to the image signal components $Y_{k-1}$, $Y_k$, $Y_{k+1}$, and $Y_{k+2}$ yields Formula (35).

$$f_k(t) = \{(-t^3 + 3t^2 - 3t + D_4)/6\}Y_{k-1} + \{(3t^3 - 6t^2 + D_3)/6\}Y_k + \quad (35)$$

$$\{(-3t^3 + 3t^2 + 3t + D_2)/6\}Y_{k+1} + \{(t^3 + D_1)/6\}Y_{k+2}$$

If t is set to be t=1, the formula shown below will obtain.

$$f_k(1)=\{(D_4-1)/6\}Y_{k-1}+\{(D_3-3)/6\}Y_k+\{(D_2+3)/6\}Y_{k+1}+\{(D_1+1)/6\}Y_{k+2}$$

As for the section $X_{k+1} \sim X_{k+2}$, Formula (35) may be rewritten as Formula (36)

$$f_{k+1}(t) = \{(-t^3 + 3t^2 - 3t + D_4)/6\}Y_k + \{(3t^3 - 6t^2 + D_3)/6\}Y_{k+1} + \quad (36)$$

$$\{(-3t^3 + 3t^2 + 3t + D_2)/6\}Y_{k+2} + \{(t^3 + D_1)/6\}Y_{k+3}$$

If t is set to be t=0, the formula shown below will obtain.

$$f_{k+1}(0)=(D_4/6)Y_k+(D_3/6)Y_{k+1}+(D_2/6)Y_{k+2}+(D_1/6)Y_{k+3}$$

From the continuity condition $\{f_k(1)=f_{k+1}(0)\}$ and the condition in that the coefficients corresponding to the respective original image signal components are equal to each other, $D_4-1=0$, $D_3-3=D_4$, $D_2+3=D_3$, $D_1+1=D_2$, and $D_1=0$. Therefore, $$D_k=(Y_{k+1}+4Y_k+Y_{k-1})/6$$

Accordingly, Formula (37) obtains.

$$Y_p = f_k(t) = \{(-t^3 + 3t^2 - 3t + 1)/6\}Y_{k-1} + \{(3t^3 - 6t^2 + 4)/6\}Y_k + \quad (37)$$

$$\{(-3t^3 + 3t^2 + 3t + 1)/6\}Y_{k+1} + (t^3/6)Y_{k+2}$$

Therefore, the interpolation coefficients $b_{k-1}$, $b_k$, $b_{k+1}$, and $b_{k+2}$, which respectively correspond to the image signal components $Y_{k-1}$, $Y_k$, $Y_{k+1}$, and $Y_{k+2}$, may be represented by the formulas shown below.

$$b_{k-1}=(-t^3+3t^2-3t+1)/6$$

$$b_k=(3t^3-6t^2+4)/6$$

$$b_{k+1}=(-3t^3+3t^2+3t+1)/6$$

$$b_{k+2}=t^3/6$$

The operations described above are repeated for the sections $X_{k-2} \sim X_{k-1}$, $X_{k-1} \sim X_k$, $X_k \sim X_{k+1}$, and $X_{k+1} \sim X_{k+2}$. In this manner, an interpolation image signal can be obtained, which is made up of image signal components occurring at intervals different from those of the image signal components of the entire original image signal.

In this manner, in cases where a secondary image (an interpolation image) having a high sharpness is to be reproduced, for example, the cubic spline interpolating operation may be used. In cases where a secondary image, which has a low sharpness and is smooth, is to be reproduced, for example, the B spline interpolating operation may be used.

In U.S. Pat. No. 5,048,105, the applicant proposed an interpolating operation method for an image signal, with which the sharpness of an interpolation image can be adjusted finely by, for example, weighting the corresponding coefficients of two interpolating functions, that provide different levels of sharpness, in accordance with a desired sharpness of the interpolation image, and adding the weighted coefficients to each other. With the proposed method, for example, in cases where the cubic spline interpolating operation function and the B spline interpolating operation function are employed as the two interpolating functions, that provide different levels of sharpness, the interpolation coefficients $C_{k-1}$, $C_k$, $C_{k+1}$, and $C_{k+2}$ for the cubic spline interpolating operation and the interpolation coefficients $b_{k-1}$, $b_k$, $b_{k+1}$, and $b_{k+2}$ for the B spline interpolating operation, which coefficients correspond to each other and are set for the respective original image signal components $Y_{k-1}$, $Y_k$, $Y_{k+1}$, and $Y_{k+2}$, are weighted and added to each other. By alteration of the weighting ratio (coefficient) $\alpha$, it is possible to obtain a secondary image having a desired level of sharpness, which is intermediate in the range from the highest sharpness to the lowest smooth sharpness.

Specifically, in cases where the interpolation coefficients for the cubic spline interpolating operation are represented by $C_k$, $C_k$, $C_{k+1}$, and $C_{k+2}$, and the interpolation coefficients for the B spline interpolating operation are represented by $b_{k-1}$, $b_k$, $b_{k+1}$, and $b_{k+2}$, weighted interpolation coefficients $a_{k-1}$, $a_k$, $a_{k+1}$, and $a_{k+2}$ are set as shown below.

$$a_{k-1}=(1-\alpha)C_{k-1}+\alpha b_{k-1}$$
$$a_k=(1-\alpha)C_{k-1}+\alpha b_{k-1}$$
$$a_{k+1}=(1-\alpha)C_{k-1}+\alpha b_{k+1}$$
$$a_{k+2}=(1-\alpha)C_{k+2}+\alpha b_{k+2}$$

wherein $0 \leq \alpha \leq 1$.

In accordance with the thus obtained new interpolation coefficients $a_{k-1}$, $a_k$, $a_{k+1}$, and $a_{k+2}$, an interpolated image signal component $Y_p$ is calculated with Formula (38).

$$Y_p=a_{k-1}Y_{k-1}+a_kY_k+a_{k+1}Y_{k+1}+a_{k+2}Y_{k+2} \quad (38)$$

An actual image is composed of the picture elements arrayed in two-dimensional directions. Therefore, the interpolation coefficient $a_k$ is represented as the interpolation coefficient Bij or Cij corresponding to each of two different directions (an i direction and a j direction) of an array of picture elements in the image.

With respect to the sharpness of the interpolation image, a wider variety of sharpness levels are often desired. For example, it is often desired to obtain an interpolation image having a sharpness higher than the sharpness of the interpolation image, which is obtained from the cubic spline interpolating operation alone. Also, it is often desired to obtain an interpolation image having a sharpness smoother than the sharpness of the interpolation image, which is obtained from the B spline interpolating operation alone.

However, with the interpolating operation method for an image signal, which is disclosed in U.S. Pat. No. 5,048,105, in cases where the cubic spline interpolating operation and the B spline interpolating operation are employed, the adjustment of sharpness can be carried out only within the range of the sharpness, which corresponds to the sharpest image obtained with the cubic spline interpolating operation, to the sharpness, which corresponds to the smoothest image obtained with the B spline interpolating operation. Therefore, the disclosed method cannot satisfy the demand for a wide variety of sharpness levels.

SUMMARY OF THE INVENTION

The primary object of the present invention is to provide an interpolating operation method for an image signal, wherein the sharpness of an interpolation image obtained by linear combination of two kinds of interpolating operations, that provide different levels of sharpness, is capable of being adjusted with a high degree of freedom.

Another object of the present invention is to provide an apparatus for carrying out the interpolating operation method for an image signal.

A further object of the present invention is to provide a spline interpolating operation method for an image signal, wherein the degree of freedom of sharpness adjustment is kept high only with a single kind of spline interpolating operation.

A still further object of the present invention is to provide an apparatus for carrying out the spline interpolating operation method for an image signal.

The present invention provides an interpolating operation method for an image signal, comprising the steps of:

i) obtaining an original image signal, which represents an original image and is made up of a series of original image signal components Yij, ii) linearly combining interpolation coefficients Bij and Cij, which correspond to each other and are set for each of the original image signal components Yij, in two different interpolating functions f and g for obtaining two interpolation images having different levels of sharpness, which functions are represented by Formulas (1) and (2), the linear combination being carried out with Formula (3), a new interpolation coefficient Aij being obtained from the linear combination, and iii) carrying out an interpolating operation on the original image signal components Yij by using an interpolating function h having the new interpolation coefficient Aij, which function is represented by Formula (4), an interpolation image signal being obtained from the interpolating operation, the interpolation image signal being made up of a series of image signal components, which occur at intervals different from those of the original image signal components Yij, $$f=\Sigma Bij \cdot Yij \quad (1)$$
$$g=\Sigma Cij \cdot Yij \quad (2)$$
$$Aij=(1-\alpha)Bij+\alpha Cij \quad (3)$$
$$h=\Sigma Aij \cdot Yij \quad (4)$$

in which i=1, 2, . . . , and j=1, 2, . . . , wherein the coefficient $\alpha$ in Formula (3) is set to be one of real numbers including a range smaller than 0 and/or a range larger than 1.

In the interpolating operation method for an image signal in accordance with the present invention, as for the two different interpolating functions for obtaining two interpolation images having different levels of sharpness, a B spline interpolating operation function should preferably be employed as the interpolating function corresponding to an image having a comparatively low sharpness, and a cubic spline interpolating operation function should preferably be employed as the interpolating function corresponding to an image having a sharpness higher than the comparatively low sharpness. This is because, in cases where the B spline interpolating operation function and the cubic spline interpolating operation function are combined with each other, the first-order differential coefficient becomes continuous.

However, the interpolating operation method for an image signal in accordance with the present invention is not limited to the combination of the B spline interpolating operation function and the cubic spline interpolating operation function. For example, various interpolating operation functions, such as the B spline interpolating operation function, the cubic spline interpolating operation function, a linear interpolating function, and a Lagrangean interpolating operation function, may be used, and an arbitrary combination of two of these functions may be employed.

Each of the term "interpolation coefficient Bij" and the term "interpolation coefficient Cij" as used herein means the interpolation coefficient corresponding to each of two different directions (an i direction and a j direction) of an array of picture elements in the image. (Each of the interpolation coefficients Bij and Cij corresponds to the coefficient, by which each original image signal component is multiplied, e.g. each of the interpolation coefficients $a_{k-1}$, $a_k$, $a_{k+1}$, and $a_{k+2}$ described above for the conventional technique.)

The interpolating operation method for an image signal in accordance with the present invention may be modified such that:

a) a plurality of first look-up tables are prepared, each of the first look-up tables setting the frequencies and the corresponding responses $R_1$ with respect to one of the two interpolating functions and for each of a plurality of different image size enlargement scale factors, b) a plurality of second look-up tables are prepared, each of the second look-up tables setting the frequencies and the corresponding responses $R_2$ with respect to the other interpolating function and for each of a plurality of different image size enlargement scale factors, c) a response $R_1$ of the one interpolating function with respect to an image size enlargement scale factor, which is desired for an interpolation image, and a response $R_2$ of the other interpolating function with respect to the image size enlargement scale factor, which is desired for the interpolation image, are calculated by making reference to a first look-up table and a second look-up table, which correspond to the image size enlargement scale factor desired for the interpolation image, and d) the coefficient α is calculated from an operation carried out with Formula (5):

$$\alpha = (R - R_1)/(R_2 - R_1) \tag{5}$$

in accordance with a response R desired for the interpolation image, the calculated response $R_1$ of the one interpolating function, and the calculated response $R_2$ of the other interpolating function.

An example of the first look-up table corresponding to a predetermined image size enlargement scale factor is illustrated in FIG. 5A. An example of the second look-up table corresponding to the predetermined image size enlargement scale factor is illustrated in FIG. 5B. By way of example, a frequency of 1 cycle/mm, to which the eyes of persons are most sensitive, is taken as a frequency of interest, and the responses $R_1$ and $R_2$ at the frequency of 1 cycle/mm are found from the first and second look-up tables. A desired response R can then be obtained by carrying out an interpolating operation using an equation of the first order, $R = \alpha R_2 + (1-\alpha)R_1$. Arrangement of this equation with respect to the coefficient α yields Formula (5). The frequency of interest is not limited to 1 cycle/mm. The other frequency may be selected as the frequency of interest in accordance with the kind of the image, or the like. As another alternative, two or more different frequencies may be selected, and the arithmetic mean value of the responses at the two or more different frequencies, or the like, may be employed as the representative value.

The extent of a change in sharpness can be easily grasped as a change in image response. Therefore, with the technique for directly specifying the response R as a desired value, an interpolation image having a sharpness truer to nature can be obtained than with the technique for specifying the value of α serving as a mere inorganic coefficient.

In cases where the technique for directly specifying the response R is employed and the image size is to be enlarged, it is necessary for the image size enlargement scale factor to be specified with a certain known means. If the first look-up table and the second look-up table corresponding to the specified image size enlargement scale factor are contained in the plurality of the look-up tables having been prepared, the first look-up table and the second look-up table may be selected. If the first look-up table and the second look-up table corresponding to the specified image size enlargement scale factor are not contained in the plurality of the look-up tables having been prepared, two first look-up tables corresponding to two image size enlargement scale factors, which are closest to the specified image size enlargement scale factor, may be selected from the first look-up table group. A response may then be calculated by carrying out an interpolating operation using an equation of the first order on the responses found from the two selected first look-up tables. Also, two second look-up tables corresponding to two image size enlargement scale factors, which are closest to the specified image size enlargement scale factor, may be selected from the second look-up table group. A response may then be calculated by carrying out an interpolating operation using an equation of the first order on the responses found from the two selected second look-up tables.

For example, six kinds of first look-up tables corresponding to image size enlargement scale factors of 1.0, 1.2, ..., 1.8, and 2.0 may be prepared. Also, six kinds of second look-up tables corresponding to image size enlargement scale factors of 1.0, 1.2, ..., 1.8, and 2.0 may be prepared. In such cases, if the specified image size enlargement scale factor is, for example, 1.3, responses $R_1(1.2)$ and $R_1(1.4)$ may be obtained from the first look-up table for the image size enlargement scale factor of 1.2 and the first look-up table for the image size enlargement scale factor of 1.4. A response $R_1(1.3)$ may then be calculated by carrying out an interpolating operation using an equation of the first order, $R_1(1.3) = 0.5R_1(1.2) + 0.5R_1(1.4)$, on the responses $R_1(1.2)$ and $R_1(1.4)$. In the same manner, the response $R_2$ of the other interpolating function may be calculated with the formula, $R_2(1.3) = 0.5R_2(1.2) + 0.5R_2(1.4)$.

Specifically, in general, in cases where look-up tables for image size enlargement scale factors of $n_1, n_2, n_3, \ldots, n_i$, and $n_{i+1}$ are prepared, if the specified image size enlargement scale factor is $n_j$ ($i \leq j \leq i+1$), a response $R_1(n_i)$ may be obtained from the look-up table for $n_i$, and a response $R_1(n_{i+1})$ may be obtained from the look-up table for $n_{i+1}$. In accordance with the responses $R_1(n_i)$ and $R_1(n_{i+1})$, the response $R_1$ of one interpolating function may be calculated with the formula, $R_1(n_j) = s \cdot R_1(n_i) + (1-s) \cdot R_1(n_{i+1})$, by using the real number, s, satisfying the condition of $0 \leq s \leq 1$. The response $R_2$ of the other interpolating function can be obtained in the same manner as that described above.

The present invention also provides an interpolating operation apparatus for an image signal, wherein:

i) an original image signal, which represents an original image and is made up of a series of original image signal components Yij, is obtained, ii) interpolation coefficients Bij and Cij, which correspond to each other and are set for each of the original image signal components Yij, in two different interpolating functions f and g for obtaining two interpolation images having different levels of sharpness, which functions are represented by Formulas (1) and (2), are linearly combined with each other, the linear combination being carried out with Formula (3), a new interpolation coefficient Aij being obtained from the linear combination, and iii) an interpolating operation is carried out on the original image signal components Yij by using an interpolating function h having the new interpolation coefficient Aij, which function is represented by Formula (4), an interpolation image signal being obtained from the interpolating operation, the interpolation image signal being made up of a series of image signal components, which occur at intervals different from those of the original image signal components Yij, $$f = \Sigma Bij \cdot Yij \quad (1)$$

$$g = \Sigma Cij \cdot Yij \quad (2)$$

$$Aij = (1-\alpha)Bij + \alpha Cij \quad (3)$$

$$h = \Sigma Aij \cdot Yij \quad (4)$$

in which i=1, 2, ..., and j=1, 2, ..., the apparatus comprising:

1) a storage means for storing information representing the interpolation coefficients Bij and Cij, 2) an input means for inputting the coefficient α as one of real numbers including a range smaller than 0 and/or a range larger than 1, the coefficient α determining the sharpness of a secondary image, which is reproduced from the interpolation image signal, 3) an interpolation coefficient operation means for calculating the interpolation coefficient Aij in accordance with the coefficient α, the calculation being carried out from the interpolation coefficients Bij and Cij, which are stored in the storage means, and the coefficient α inputted from the input means, and 4) an interpolating operation means for storing Formula (4) as the operation formula, and calculating the value of an interpolated image signal component $Y_p$, which corresponds to an interpolation point $X_p$, with Formula (4) in accordance with the interpolation coefficient Aij, which has been calculated by the interpolation coefficient operation means, and each of the original image signal components Yij.

In the interpolating operation apparatus for an image signal in accordance with the present invention, as for the two different interpolating functions for obtaining two interpolation images having different levels of sharpness, a B spline interpolating operation function should preferably be employed as the interpolating function corresponding to an image having a comparatively low sharpness, and a cubic spline interpolating operation function should preferably be employed as the interpolating function corresponding to an image having a sharpness higher than the comparatively low sharpness.

However, the interpolating operation apparatus for an image signal in accordance with the present invention is not limited to the combination of the B spline interpolating operation function and the cubic spline interpolating operation function. For example, various interpolating operation functions, such as the B spline interpolating operation function, the cubic spline interpolating operation function, a linear interpolating function, and a Lagrangean interpolating operation function, may be used, and an arbitrary combination of two of these functions may be employed.

The interpolating operation apparatus for an image signal in accordance with the present invention may be modified such that the input means may be provided with:

a) a response input means for inputting a response R desired for the interpolation image, b) a plurality of first look-up tables, each of the first look-up tables setting the frequencies and the corresponding responses $R_1$ with respect to one of the two interpolating functions and for each of a plurality of different image size enlargement scale factors, c) a plurality of second look-up tables, each of the second look-up tables setting the frequencies and the corresponding responses $R_2$ with respect to the other interpolating function and for each of a plurality of different image size enlargement scale factors, and d) a coefficient calculating means for calculating a response $R_1$ of the one interpolating function with respect to an image size enlargement scale factor, which is desired for an interpolation image, and a response $R_2$ of the other interpolating function with respect to the image size enlargement scale factor, which is desired for the interpolation image, by making reference to a first look-up table and a second look-up table, which correspond to the image size enlargement scale factor desired for the interpolation image, and for calculating the coefficient α from an operation carried out with Formula (5):

$$\alpha = (R - R_1)/(R_2 - R_1) \quad (5)$$

in accordance with the response R desired for the interpolation image, the calculated response $R_1$ of the one interpolating function, and the calculated response $R_2$ of the other interpolating function.

In such cases, the image size enlargement scale factor, which is the enlargement scale factor of the interpolation image with respect to the original image, may be inputted from an independent enlargement scale factor input means, or the like. Alternatively, the response input means may also serve as the means for inputting the image size enlargement scale factor.

As the first look-up table and the second look-up table corresponding to a predetermined image size enlargement scale factor, for example, those illustrated in FIGS. 5A and 5B may be employed. As in the aforesaid interpolating operation method in accordance with the present invention, in cases where the first look-up table and the second look-up table corresponding to the inputted image size enlargement scale factor are not contained in the plurality of the look-up tables, two first look-up tables corresponding to two image size enlargement scale factors, which are closest to the inputted image size enlargement scale factor, may be selected from the first look-up table group. A response may then be calculated by carrying out an interpolating operation using an equation of the first order on the responses found from the two selected first look-up tables. Also, two second look-up tables corresponding to two image size enlargement scale factors, which are closest to the inputted image size enlargement scale factor, may be selected from the second look-up table group. A response may then be calculated by carrying out an interpolating operation using an equation of the first order on the responses found from the two selected second look-up tables.

The present invention further provides a first spline interpolating operation method for an image signal, wherein an interpolating operation using a third-order spline interpolating function is carried out on an original image signal, which represents an original image and is made up of a series of original image signal components, and an interpolation image signal is obtained with Formula (6), the interpolation image signal being made up of a series of image signal components, which occur at intervals different from those of the original image signal components, $$Y_p=a_{k-1}Y_{k-1}+a_kY_k+a_{k+1}Y_{k+1}+a_{k+2}Y_{k+2} \qquad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the method comprising the steps of:

i) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+2}$ such that, in cases where the original image signal components representing the two picture elements $X_{k-1}$ and $X_k$ located before the interpolation point $X_p$, which is located between the picture elements $X_k$ and $X_{k+1}$ in the original image, are represented by $Y_{k-1}$ and $Y_k$, the original image signal components representing the two picture elements $X_{k+1}$ and $X_{k+2}$ located after the interpolation point $X_p$ are represented by $Y_{k+1}$ and $Y_{k+2}$, the third-order spline interpolating function between the picture elements $X_k$ and $X_{k+1}$ is represented by $f_k$, the third-order spline interpolating function between the picture elements $X_{k-1}$ and $X_k$ is represented by $f_{k-1}$, and the third-order spline interpolating function between the picture elements $X_{k+1}$ and $X_{k+2}$ is represented by $f_{k+1}$:

a) the spline interpolating function $f_k$ at the picture elements $X_k$ and $X_{k+1}$ may satisfy the original image signal components $Y_k$ and $Y_{k+1}$, as represented by Formulas (7) and (8):

$$f_k(X_k)=Y_k \qquad (7)$$

$$f_k(X_{k+1})=Y_{k+1} \qquad (8)$$

b) the first-order differential coefficient of the spline interpolating function $f_k$ at the picture element $X_k$ may coincide with the first-order differential coefficient of the spline interpolating function $f_{k-1}$ at the picture element $X_k$, as represented by Formula (9):

$$f_k'(X_k)=f_{k-1}'(X_k) \qquad (9)$$

c) the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (10):

$$f_k'(X_{k+1})=f_{k+1}'(X_{k+1}) \qquad (10)$$

d) the first-order differential coefficient of the spline interpolating function $f_k$ at the picture element $X_k$ may have an inclination of an arbitrary parameter $\alpha$ with respect to the gradient of the original image signal components $Y_{k-1}$ and $Y_{k+1}$ representing the picture elements $X_{k-1}$ and $X_{k+1}$, which are located before and after the picture element $X_k$, as represented by Formula (11), the arbitrary parameter $\alpha$ being selected previously and determining the sharpness of a secondary image represented by the interpolation image signal, $$f_k'(X_k)=\alpha(Y_{k+1}-Y_{k-1})/(X_{k+1}-X_{k-1}) \qquad (11)$$

and e) the first-order differential coefficient of the spline interpolating function $f_k$ at the picture element $X_{k+1}$ may have an inclination of the parameter $\alpha$ with respect to the gradient of the original image signal components $Y_k$ and $Y_{k+2}$ representing the picture elements $X_k$ and $X_{k+2}$, which are located before and after the picture element $X_{k+1}$, as represented by Formula (12):

$$f_k'(X_{k+1})=\alpha(Y_{k+2}-Y_k)/(X_{k+2}-X_k) \qquad (12)$$

and ii) calculating the interpolated image signal component $Y_p$ corresponding to the interpolation point $X_p$ in accordance with the calculated interpolation coefficients $a_{k-1}$, $a_k$, $a_{k+1}$, and $a_{k+2}$, and the original image signal components $Y_{k-1}$, $Y_k$, $Y_{k+1}$, and $Y_{k+2}$.

Specifically, in the first spline interpolating operation method for an image signal in accordance with the present invention, the calculated interpolation coefficients $a_{k-1}$, $a_k$, $a_{k+1}$, and $a_{k+2}$ may respectively be represented by Formulas (13), (14), (15), and (16):

$$a_{k-1}=-(\alpha/2)t(t-1)^2 \qquad (13)$$

$$a_k=(2-\alpha/2)t^3-(3-\alpha/2)t^2+1 \qquad (14)$$

$$a_{k+1}=(\alpha/2-2)t^3+(3-\alpha)t^2+(\alpha/2)t \qquad (15)$$

$$a_{k+2}=(\alpha/2)t^2(t-1) \qquad (16)$$

in which t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components (i.e., the picture element interval) being set to be equal to 1.

The present invention still further provides a second spline interpolating operation method for an image signal, wherein an interpolating operation using a third-order spline interpolating function is carried out on an original image signal, which represents an original image and is made up of a series of original image signal components, and an interpolation image signal is obtained with Formula (6), the interpolation image signal being made up of a series of image signal components, which occur at intervals different from those of the original image signal components, $$Y_p=a_{k-1}Y_{k-1}+a_kY_k+a_{k+1}Y_{k+1}+a_{k+2}Y_{k+2} \qquad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the method comprising the steps of:

i) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+2}$ such that, in cases where the original image signal components representing the two picture elements $X_{k-1}$ and $X_k$ located before the interpolation point $X_p$, which is located between the picture elements $X_k$ and $X_{k+1}$ in the original image, are represented by $Y_{k-1}$ and $Y_k$, the original image signal components representing the two picture elements $X_{k+1}$ and $X_{k+2}$ located after the interpolation point $X_p$ are represented by $Y_{k+1}$ and $Y_{k+2}$, the third-order spline interpolating function between the picture elements $X_k$ and $X_{k+1}$ is represented by $f_k$, the third-order spline interpolating function between the picture elements $X_{k-1}$ and $X_k$ is represented by $f_{k-1}$, and the third-order spline interpolating function between the picture elements $X_{k+1}$ and $X_{k+2}$ is represented by $f_{k+1}$:

a) the spline interpolating function $f_k$ at the picture elements $X_k$ and $X_{k+1}$ may slightly deviate from the original image signal components $Y_k$ and $Y_{k+1}$ in accordance with an arbitrary parameter $\beta$, as represented by Formulas (17) and (18), the arbitrary parameter $\beta$ being selected previously and determining the sharpness of a secondary image represented by the interpolation image signal, $$f_k(X_k) = -0.5\beta Y_{k-1} + (1+\beta)Y_k - 0.5\beta Y_{k+1} \quad (17)$$

$$f_k(X_{k+1}) = -0.5\beta Y_k + (1+\beta)Y_{k+1} - 0.5\beta Y_{k+2} \quad (18)$$

b) the first-order differential coefficient of the spline interpolating function $f_k$ at the picture element $X_k$ may coincide with the first-order differential coefficient of the spline interpolating function $f_{k-1}$ at the picture element $X_k$, as represented by Formula (9):

$$f_k'(X_k) = f_{k-1}'(X_k) \quad (9)$$

c) the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (10):

$$f_k'(X_{k+1}) = f_{k+1}'(X_{k+1}) \quad (10)$$

d) the first-order differential coefficient of the spline interpolating function $f_k$ at the picture element $X_k$ may coincide with the gradient of the original image signal components $Y_{k-1}$ and $Y_{k+1}$ representing the picture elements $X_{k-1}$ and $X_{k+1}$, which are located before and after the picture element $X_k$, as represented by Formula (19):

$$f_k'(X_k) = (Y_{k+i} - Y_{k-1})/(X_{k+1} - X_{k-1}) \quad (19)$$

and e) the first-order differential coefficient of the spline interpolating function $f_k$ at the picture element $X_{k+1}$ may coincide with the gradient of the original image signal components $Y_k$ and $Y_{k+2}$ representing the picture elements $X_k$ and $X_{k+2}$, which are located before and after the picture element $X_{k+1}$, as represented by Formula (20):

$$f_k'(X_{k+1}) = (Y_{k+2} - Y_k)/(X_{k+2} - X_k) \quad (20)$$

and ii) calculating the interpolated image signal component $Y_p$ corresponding to the interpolation point $X_p$ in accordance with the calculated interpolation coefficients $a_{k-1}$, $a_k$, $a_{k+1}$, and $a_{k+2}$, and the original image signal components $Y_{k-1}$, $Y_k$, $Y_{k+1}$, and $Y_{k+2}$.

Specifically, in the second spline interpolating operation method for an image signal in accordance with the present invention, the calculated interpolation coefficients $a_{k-1}$, $a_k$, $a_{k+1}$, and $a_{k+2}$ may respectively be represented by Formulas (21), (22), (23), and (24):

$$a_{k-1} = -(\beta+1/2)t^3 + (3\beta/2+1)t^2 - (1/2)t - \beta/2 \quad (21)$$

$$a_k = 3(\beta+1/2)t^3 - (9\beta/2+5/2)t^2 + \beta + 1 \quad (22)$$

$$a_{k+1} = -3(\beta+1/2)t^3 + (9\beta/2+2)t^2 + (1/2)t - \beta/2 \quad (23)$$

$$a_{k+2} = (\beta+1/2)t^3 - (3\beta/2+1/2)t^2 \quad (24)$$

in which t, where $0 \geq t < 1$, represents the position of the interpolation point $X_p$, the position being taken with respect to the picture element $X_k$, that serves as a reference position, and in the direction heading toward the picture element $X_{k+1}$, the lattice interval of the original image signal components (i.e., the picture element interval) being set to be equal to 1.

The present invention also provides a third spline interpolating operation method for an image signal, wherein an interpolating operation using a third-order spline interpolating function is carried out on an original image signal, which represents an original image and is made up of a series of original image signal components, and an interpolation image signal is obtained with Formula (6), the interpolation image signal being made up of a series of image signal components, which occur at intervals different from those of the original image signal components, $$Y_p = a_{k-1}Y_{k-1} + a_k Y_k + a_{k+1}Y_{k+1} + a_{k+2}Y_{k+2} \quad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the method comprising the steps of:

i) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+2}$ such that, in cases where the original image signal components representing the two picture elements $X_{k-1}$ and $X_k$ located before the interpolation point $X_p$, which is located between the picture elements $X_k$ and $X_{k+1}$ in the original image, are represented by $Y_{k-1}$ and $Y_k$, the original image signal components representing the two picture elements $X_{k+1}$ and $X_{k+2}$ located after the interpolation point $X_p$ are represented by $Y_{k+1}$ and $Y_{k+2}$, the third-order spline interpolating function between the picture elements $X_k$ and $X_{k+1}$ is represented by $f_k$, the third-order spline interpolating function between the picture elements $X_{k-1}$ and $X_k$ is represented by $f_{k-1}$, and the third-order spline interpolating function between the picture elements $X_{k+1}$ and $X_{k+2}$ is represented by $f_{k+1}$:

a) the spline interpolating function $f_k$ at the picture elements $X_k$ and $X_{k+1}$ may satisfy the original image signal components $Y_k$ and $Y_{k+1}$, as represented by Formulas (7) and (8):

$$f_k(X_k) = Y_k \quad (7)$$

$$f_k(X_{k+1}) = Y_{k+1} \quad (8)$$

b) the first-order differential coefficient of the spline interpolating function $f_k$ at the picture element $X_k$ may coincide with the first-order differential coefficient of the spline interpolating function $f_{k-1}$ at the picture element $X_k$, as represented by Formula (9):

$$f_k'(X_k) = f_{k-1}'(X_k) \qquad (9)$$

c) the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (10):

$$f_k'(X_{k+1}) = f_{k+1}'(X_{k+1}) \qquad (10)$$

d) the first-order differential coefficient of the spline interpolating function $f_k$ at the picture element $X_k$ may have an inclination of an arbitrary parameter $\alpha$ with respect to the gradient of the original image signal components $Y_{k-1}$ and $Y_{k+1}$ representing the picture elements $X_{k-1}$ and $X_{k+1}$, which are located before and after the picture element $X_k$, as represented by Formula (11), the arbitrary parameter $\alpha$ being selected previously and determining the sharpness of a secondary image represented by the interpolation image signal, $$f_k'(X_k) = \alpha(Y_{k+1} - Y_{k-1})/(X_{k+1} - X_{k-1}) \qquad (11)$$

and e) the first-order differential coefficient of the spline interpolating function $f_k$ at the picture element $X_{k+1}$ may have an inclination of the parameter $\alpha$ with respect to the gradient of the original image signal components $Y_k$ and $Y_{k+2}$ representing the picture elements $X_k$ and $X_{k+2}$, which are located before and after the picture element $X_{k+1}$, as represented by Formula (12):

$$f_k'(X_{k+1}) = \alpha(Y_{k+2} - Y_k)/(X_{k+2} - X_k) \qquad (12)$$

ii) calculating interpolation coefficients $b_{k-1}$, $b_k$, $b_{k+1}$, and $b_{k+2}$ respectively corresponding to the original image signal components $Y_{k-1}$, $Y_k$, $Y_{k+1}$, and $Y_{k+2}$ such that:

f) the spline interpolating function $f_k$ at the picture elements $X_k$ and $X_{k+1}$ may slightly deviate from the original image signal components $Y_k$ and $Y_{k+1}$ in accordance with an arbitrary parameter $\beta$, as represented by Formulas (17) and (18), the arbitrary parameter $\beta$ being selected previously and determining the sharpness of the secondary image represented by the interpolation image signal, $$f_k(X_k) = -0.5\beta Y_{k-1} + (1+\beta)Y_k - 0.5\beta Y_{k+1} \qquad (17)$$

$$f_k(X_{k+1}) = -0.5\beta Y_k + (1+\beta)Y_{k+1} - 0.5\beta Y_{k+2} \qquad (18)$$

g) the first-order differential coefficient of the spline interpolating function $f_k$ at the picture element $X_k$ may coincide with the first-order differential coefficient of the spline interpolating function $f_{k-1}$ at the picture element $X_k$, as represented by Formula (9):

$$f_k'(X_k) = f_{k-1}'(X_k) \qquad (9)$$

h) the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (10):

$$f_k'(X_{k+1}) = f_{k+1}'(X_{k+1}) \qquad (10)$$

i) the first-order differential coefficient of the spline interpolating function $f_k$ at the picture element $X_k$ may coincide with the gradient of the original image signal components $Y_{k-1}$ and $Y_{k+1}$ representing the picture elements $X_{k-i}$ and $X_{k+1}$, which are located before and after the picture element $X_k$, as represented by Formula (19):

$$f_k'(X_k) = (Y_{k+1} - Y_{k-1})/(X_{k+1} - X_{k-1}) \qquad (19)$$

and j) the first-order differential coefficient of the spline interpolating function $f_k$ at the picture element $X_{k+1}$ may coincide with the gradient of the original image signal components $Y_k$ and $Y_{k+2}$ representing the picture elements $X_k$ and it $X_{k+2}$, which are located before and after the picture element $X_{k+1}$, as represented by Formula (20):

$$f_k'(X_{k+1}) = (Y_{k+2} - Y_k)/(X_{k+2} - X_k) \qquad (20)$$

iii) calculating mean values $(a_{k-1}+b_{k-1})/2$, $(a_{k+bk})/2$, $(a_{k+1}+b_{k+1})/2$, and $(a_{k+2}+b_{k+2})/2$ of the respective sets of the interpolation coefficients, which sets respectively correspond to the original image signal components $Y_{k-1}$, $Y_k$, $Y_{k+1}$, and $Y_{k+2}$, the calculated mean values being taken as the values of new interpolation coefficients $a_{k-1}$, $a_k$, $a_{k+1}$, and $a_{k+2}$, and iv) calculating the interpolated image signal component $Y_p$ corresponding to the interpolation point $X_p$ in accordance with the calculated new interpolation coefficients $a_{k-1}$, $a_k$, $a_{k+1}$, and $a_{k+2}$, and the original image signal components $Y_{k-1}$, $Y_k$, $Y_{k+1}$, and $Y_{k+2}$.

Specifically, in the third spline interpolating operation method for an image signal in accordance with the present invention, the calculated new interpolation coefficients $a_{k-1}$, $a_k$, $a_{k+1}$, and $a_{k+2}$, which represent the mean values, may respectively be represented by Formulas (25), (26), (27), and (28):

$$a_{k-1} = -\{(\alpha+2\beta+1)/4\}t^3 + \{(2\alpha+3\beta+2)/4\}t^2 - \{(\alpha+1)/4\}t - \beta/4 \qquad (25)$$

$$a_k = \{(-\alpha+6\beta+7)/4\}t^3 + \{(\alpha-9\beta-11)/4\}t^2 + \beta/2 + 1 \qquad (26)$$

$$a_{k+1} = \{(\alpha-6\beta-7)/4\}t^3 + \{(-2\alpha+9\beta+10)/4\}t^2 + \{(\alpha+1)/4\}t - \beta/4 \qquad (27)$$

$$a_{k+2} = \{(\alpha+2\beta+1)/4\}t^3 - \{(\alpha+3\beta+1)/4\}t^2 \qquad (28)$$

in which t, where $0 \geq t < 1$, represents the position of the interpolation point $X_p$, the position being taken with respect to the picture element $X_k$, that serves as a reference position, and in the direction heading toward the picture element $X_{k+1}$, the lattice interval of the original image signal components (i.e., the picture element interval) being set to be equal to 1.

The present invention further provides a first spline interpolating operation apparatus for an image signal, wherein an interpolating operation using a third-order spline interpolating function is carried out on an original image signal, which represents an original image and is made up of a series of original image signal components, and an interpolation image signal is obtained with Formula (6), the interpolation image signal being made up of a series of image signal components, which occur at intervals different from those of the original image signal components, $$Y_p = a_{k-1}Y_{k-1} + a_k Y_k + a_{k+1}Y_{k+1} + a_{k+2}Y_{k+2} \qquad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the apparatus comprising:

1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $X_{k-1}$, $X_k$, $X_{k+1}$, and $X_{k+2}$ in the original image, and which are set to be respectively represented by Formulas (13), (14), (15), and (16):

$$a_{k-1} = -(\alpha/2)t(t-1)^2 \qquad (13)$$

$$a_k = (2-\alpha/2)t^3 - (3-\alpha/2)t^2 + 1 \qquad (14)$$

$$a_{k+1} = (\alpha/2-2)t^3 + (3-t)t^2 + (\alpha/2)t \qquad (15)$$

$$a_{k+2} = (\alpha/2)t^2(t-1) \qquad (16)$$

in which $\alpha$ represents the parameter determining the sharpness of a secondary image represented by the interpolation image signal, and t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameter $\alpha$, which determines the sharpness of the secondary image reproduced from the interpolation image signal, 3) an interpolation coefficient operation means for calculating the interpolation coefficients $a_{k-1}$, $a_k$, $a_{k+1}$, and $a_{k+2}$ in accordance with the parameter $\alpha$, the calculation being carried out from the interpolation coefficients, which are stored in the storage means, and the parameter $\alpha$ inputted from the input means, and 4) an interpolating operation means for storing Formula (6) as the operation formula, and calculating the value of the interpolated image signal component $Y_p$, which corresponds to the interpolation point $X_p$, with Formula (6) in accordance with the interpolation coefficients $a_{k-1}$, $a_k$, $a_{k+1}$, and $a_{k+2}$, which have been calculated by the interpolation coefficient operation means, and the original image signal components $Y_{k-1}$, $Y_k$, $Y_{k+1}$, and $Y_{k+2}$.

The present invention still further provides a second spline interpolating operation apparatus for an image signal, wherein an interpolating operation using a third-order spline interpolating function is carried out on an original image signal, which represents an original image and is made up of a series of original image signal components, and an interpolation image signal is obtained with Formula (6), the interpolation image signal being made up of a series of image signal components, which occur at intervals different from those of the original image signal components, $$Y_p = a_{k-1}Y_{k-1} + a_k Y_k + a_{k+1}Y_{k+1} + a_{k+2}Y_{k+2} \qquad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the apparatus comprising:

1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $X_{k-1}$, $X_k$, $X_{k+1}$, and $X_{k+2}$ in the original image, and which are set to be respectively represented by Formulas (21), (22), (23), and (24):

$$a_{k-1} = -(\beta+1/2)t^3 + (3\beta/2+1)t^2 - (1/2)t - \beta/2 \qquad (21)$$

$$a_k = 3(\beta+1/2)t^3 - (9\beta/2+5/2)t^2 + \beta + 1 \qquad (22)$$

$$a_{k+1} = -3(\beta+1/2)t^3 + (9\beta/2+2)t^2 + (1/2)t - \beta/2 \qquad (23)$$

$$a_{k+2} = (\beta+1/2)t^3 - (3\beta/2+1/2)t^2 \qquad (24)$$

in which $\beta$ represents the parameter determining the sharpness of a secondary image represented by the interpolation image signal, and t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameter $\beta$, which determines the sharpness of the secondary image reproduced from the interpolation image signal, 3) an interpolation coefficient operation means for calculating the interpolation coefficients $a_{k-1}$, $a_k$, $a_{k+1}$, and $a_{k+2}$ in accordance with the parameter $\beta$, the calculation being carried out from the interpolation coefficients, which are stored in the storage means, and the parameter $\beta$ inputted from the input means, and 4) an interpolating operation means for storing Formula (6) as the operation formula, and calculating the value of the interpolated image signal component $Y_p$, which corresponds to the interpolation point $X_p$, with Formula (6) in accordance with the interpolation coefficients $a_{k-1}$, $a_k$, $a_{k+1}$, and $a_{k+2}$, which have been calculated by the interpolation coefficient operation means, and the original image signal components $Y_{k-1}$, $Y_k$, $Y_{k+1}$, and $Y_{k+2}$.

The present invention also provides a third spline interpolating operation apparatus for an image signal, wherein an interpolating operation using a third-order spline interpolating function is carried out on an original image signal, which represents an original image and is made up of a series of original image signal components, and an interpolation image signal is obtained with Formula (6), the interpolation image signal being made up of a series of image signal components, which occur at intervals different from those of the original image signal components, $$Y_p = a_{k-1}Y_{k-1} + a_k Y_k + a_{k+1}Y_{k+1} + a_{k+2}Y_{k+2} \qquad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the apparatus comprising:

1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $X_{k-1}$, $X_k$, $X_{k+1}$, and $X_{k+2}$ in the original image, and which are set to be respectively represented by Formulas (25), (26), (27), and (28):

$$a_{k-1} = -\{(\alpha+2\beta+1)/4\}t^3 + \{(2\alpha+3\beta+2)/4\}t^2 - \{(\alpha+1)/4\}t - \beta/4 \quad (25)$$

$$a_k = \{(-\alpha+6\beta+7)/4\}t^3 + \{(\alpha-9\beta-11)/4\}t^2 + \beta/2 + 1 \quad (26)$$

$$a_{k+1} = \{(\alpha-6\beta-7)/4\}t^3 + \{(-2\alpha+9\beta+10)/4\}t^2 + \{(\alpha+1)/4\}t - \beta/4 \quad (27)$$

$$a_{k+2} = \{(\alpha+2\beta+1)/4\}t^3 - \{(\alpha+3\beta+1)/4\}t^2 \quad (28)$$

in which $\alpha$ and $\beta$ represent the parameters determining the sharpness of a secondary image represented by the interpolation image signal, and t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameters $\alpha$ and $\beta$, which determine the sharpness of the secondary image reproduced from the interpolation image signal, 3) an interpolation coefficient operation means for calculating the interpolation coefficients $a_{k-1}$, $a_k$, $a_{k+1}$, and $a_{k+2}$ in accordance with the parameters $\alpha$ and $\beta$, the calculation being carried out from the interpolation coefficients, which are stored in the storage means, and the parameters $\alpha$ and $\beta$ inputted from the input means, and 4) an interpolating operation means for storing Formula (6) as the operation formula, and calculating the value of the interpolated image signal component $Y_p$, which corresponds to the interpolation point $X_p$, with Formula (6) in accordance with the interpolation coefficients $a_{k-1}$, $a_k$, $a_{k+1}$, and $a_{k+2}$, which have been calculated by the interpolation coefficient operation means, and the original image signal components $Y_{k-1}$, $Y_k$, $Y_{k+1}$, and $Y_{k+2}$.

With the interpolating operation method and apparatus for an image signal in accordance with the present invention, the new interpolation coefficient is obtained for each of the original image signal components of the original image signal representing the original image by linearly combining the interpolation coefficients, which correspond to each other and are set for each of the original image signal components, in a first interpolating function f for obtaining an interpolation image having a first sharpness and a second interpolating function g for obtaining an interpolation image having a second sharpness different from the first sharpness. At this time, the coefficient for the weighting of the two interpolation coefficients in the linear combination is not limited to the range of 0 to 1, and is set to be an arbitrary real number. In this manner, interpolation images having a wide variety of levels of sharpness, which are not limited to the sharpness range between the first sharpness and the second sharpness, can be obtained.

Specifically, the first interpolating function f and the second interpolating function g may be represented by the formulas $$f = \Sigma Bij \cdot Yij, \quad g = \Sigma Cij \cdot Yij$$

in which Yij represents the original image signal components, and Bij and Cij represent the interpolation coefficients. In such cases, the term "linearly combining interpolation coefficients, which correspond to each other and are set for each of original image signal components" as used herein means that the operation is carried out with, for example, the formula $$A12 = (1-\alpha)B12 + \alpha C12$$

wherein $\alpha$ represents all real numbers, on the interpolation coefficient B12 in the interpolating function f and the interpolation coefficient C12 in the interpolating function g. which coefficients are for the original image signal component Y12 (in cases where i=1, and j=2).

Also, as for the interpolation coefficients Bij and Cij for the other original image signal components Yij, the interpolation coefficients Bij and Cij are linearly combined with each other by carrying out the operations with Formula (3)

$$Aij = (1-\alpha)Bij + \alpha Cij \quad (3)$$

and the new interpolation coefficients Aij are thereby obtained.

In the conventional technique for the linear combination, the coefficient $\alpha$ was limited to the real numbers falling within the range of 0 to 1. However, with the interpolating operation method and apparatus for an image signal in accordance with the present invention, the coefficient $\alpha$ can take even a value less than 0 and a value more than 1. Therefore, an interpolation image can be obtained, which has a sharpness higher than the sharpness of the interpolation image obtained with the interpolating function f or g, whichever is capable of yielding an interpolation image having a higher sharpness. Alternatively, an interpolation image can be obtained, which has a lower sharpness and is smoother than the interpolation image obtained with the interpolating function f or g, whichever is capable of yielding an interpolation image, that has a lower sharpness and is smoother. Accordingly, the degree of freedom of the selection of sharpness of the interpolation image in accordance with the kind of the image and the image size enlargement scale factor can be kept markedly high. For example, as for a radiation image of a blood vessel, a very sharp image is desired. In such cases, the coefficient for the weighting of the interpolation coefficient (e.g., Cij) in the interpolating function, which yields a higher sharpness, may be set to be a value larger than 1. As a result, an interpolation image having a very high sharpness can be obtained. As for a CT scanner image of the liver, it is desired that a step-wise density change portion, which often occur due to a low CT resolution, can be reproduced to be unsharp. In such cases, the coefficient for the weighting of the interpolation coefficient (e.g., Bij) in the interpolating function, which yields a lower sharpness, may be set to be a value larger than 1. As a result, an interpolation image having a very low sharpness can be obtained. In this manner, the interpolating operation method and apparatus for an image signal in accordance with the present invention can meet various demands.

In the interpolating operation apparatus for an image signal in accordance with the present invention, the input means may be provided with the response input means for inputting a response R desired for the interpolation image, a plurality of the first look-up tables with respect to one of the two interpolating functions, a plurality of the second look-up tables with respect to the other interpolating function, and the coefficient calculating means. In such cases, the response R of the image, with which the extent of the change in sharpness can be grasped easily, can be specified directly as a desired value. The coefficient $\alpha$ corresponding to the response is then calculated by using the first and second look-up tables. Therefore, an interpolation image having a sharpness truer to nature can be obtained than with the apparatus for specifying the value of $\alpha$ serving as a mere inorganic coefficient.

With the first spline interpolating operation method and apparatus for an image signal in accordance with the present invention, the first-order differential coefficient of the third-order spline interpolating function $f_k$ corresponding to the section $X_k$~$X_{k+1}$, in which the interpolation point $X_p$ is located, at the picture element $X_k$ is set to have an inclination of an arbitrary parameter $\alpha$ with respect to the gradient of the original image signal components $Y_{k-1}$ and $Y_{k+1}$ representing the picture elements $X_{k-1}$ and $X_{k+1}$, which are located before and after the picture element $X_k$, the arbitrary parameter $\alpha$ being selected previously and determining the sharpness of a secondary image represented by the interpolation image signal. Also, the first-order differential coefficient of the spline interpolating function $f_k$ at the picture element $X_{k+1}$ is set to have an inclination of the parameter $\alpha$ with respect to the gradient of the original image signal components $Y_k$ and $Y_{k+2}$ representing the picture elements $X_k$ and $X_{k+2}$, which are located before and after the picture element $X_{k+1}$. Therefore, an interpolation image signal having a desired level of sharpness can be obtained by arbitrarily altering the value of the parameter $\alpha$.

Specifically, with the conventional cubic spline interpolating operation, as represented by Formulas (19) and (20), the parameter $\alpha$ in Formulas (11) and (12) is fixed to be equal to 1. Therefore, in cases where the conventional cubic spline interpolating operation is carried alone, or in cases where the conventional B spline interpolating operation is carried out alone, only the secondary image having a single level of sharpness can be obtained. Also, with the spline interpolating operation, in which the cubic spline interpolating operation and the B spline interpolating operation are combined with each other and which is disclosed in U.S. Pat. No. 5,048,105, the adjustment of sharpness can be carried out only within the range of the sharpness, which is obtained with the cubic spline interpolating operation, to the sharpness, which is obtained with the B spline interpolating operation. However, with the first spline interpolating operation method for an image signal in accordance with the present invention, by the setting of the parameter $\alpha$ to be larger than 1, an interpolation image having a sharpness higher than the sharpness of the interpolation image, which is obtained from the conventional cubic spline interpolating operation, can be obtained. As the parameter $\alpha$ is set to be a larger value, a higher sharpness can be obtained. Also, by the setting of the parameter $\alpha$ to be smaller than 1, an interpolation image having a sharpness lower than the sharpness of the interpolation image, which is obtained from the conventional B spline interpolating operation, can be obtained.

As the parameter $\alpha$ is set to be a smaller value, a lower sharpness can be obtained.

Further, the calculation processing with the first spline interpolating operation method for an image signal in accordance with the present invention can be carried out only with the same calculation processing as the conventional cubic spline interpolating operation. Therefore, with the first spline interpolating operation method for an image signal in accordance with the present invention, the calculation processing can be kept simpler than in the spline interpolating operation disclosed in U.S. Pat. No. 5,048,105. Accordingly, the time required to carry out the calculation processing can be kept short, while the adjustment of sharpness is being enabled.

With the second spline interpolating operation method and apparatus for an image signal in accordance with the present invention, the values of the third-order spline interpolating function $f_k$ corresponding to the section $X_k$~$X_{k+1}$, in which the interpolation point $X_p$ is located, at the picture elements $X_k$ and $X_{k+1}$ are set to slightly deviate from the original image signal components $Y_k$ and $Y_{k+1}$ in accordance with an arbitrary parameter $\beta$, which is selected previously and determines the sharpness of a secondary image represented by the interpolation image signal. Therefore, an interpolation image signal having a desired level of sharpness can be obtained by arbitrarily altering the value of the parameter $\beta$.

Specifically, in cases where the conventional cubic spline interpolating operation is carried alone, or in cases where the conventional B spline interpolating operation is carried out alone, only the secondary image having a single level of sharpness can be obtained. Also, with the spline interpolating operation, in which the cubic spline interpolating operation and the B spline interpolating operation are combined with each other and which is disclosed in U.S. Pat. No. 5,048,105, the adjustment of sharpness can be carried out only within the range of the sharpness, which is obtained with the cubic spline interpolating operation, to the sharpness, which is obtained with the B spline interpolating operation. However, with the second spline interpolating operation method for an image signal in accordance with the present invention, by the setting of the parameter $\beta$ to be equal to a value other than 0, an interpolation image having a sharpness higher than the sharpness of the interpolation image, which is obtained from the conventional cubic spline interpolating operation, can be obtained. Also, an interpolation image having a sharpness lower than the sharpness of the interpolation image, which is obtained from the conventional B spline interpolating operation, can be obtained.

Further, as represented by Formulas (17) and (18), in cases where the value on one end side of the spline interpolating function $f_k$ corresponding to the section $X_k$~$X_{k+1}$ is increased, the value on the other end side of the spline interpolating function $f_k$ is decreased. Therefore, even if the interpolating operation is carried out on an original image, the original image signal components of which are distributed with approximately equal values, the values of the interpolation image signal will not become far different from the values of the original image signal. Accordingly, an interpolation image having a natural feeling can be obtained.

Furthermore, the calculation processing with the second spline interpolating operation method for an image signal in accordance with the present invention can be carried out only with the same calculation processing as the conventional cubic spline interpolating operation. Therefore, with the second spline interpolating operation method for an image signal in accordance with the present invention, the time required to carry out the calculation processing can be kept short, while the adjustment of sharpness is being enabled.

With the third spline interpolating operation method and apparatus for an image signal in accordance with the present invention, the mean values of the values of the interpolation coefficients, which are obtained with the aforesaid first spline interpolating operation method (and apparatus) for an image signal, and the values of the corresponding interpolation coefficients, which are obtained with the aforesaid second spline interpolating operation method (and apparatus) for an image signal, are taken as the values of the new interpolation coefficients. The two spline interpolating operation methods (and apparatuses) can thus be combined with each other, and the degree of freedom of the sharpness adjustment can thereby be kept higher.

BRIEF DESCRIPTION OF THE DRAWINGS

FIG. 2 is a perspective view showing an image read-out apparatus, FIG. 3 is a block diagram showing an input means, which is provided with a response input means, first and second look-up tables, and a coefficient calculating means, FIG. 4 is an explanatory graph showing how interpolated image signal components are obtained with a conventional cubic spline interpolating operation from original image signal components, which are sampled with a period of an equal interval and represent sampling points (picture elements) arrayed in one direction, FIG. 6 is a schematic block diagram showing an image reproducing system provided with an embodiment of the spline interpolating operation apparatus for carrying out the spline interpolating operation method for an image signal in accordance with the present invention, FIGS. 10A, 10B, and 10C are graphs showing interpolation coefficients obtained when the values of the parameters (α, β) are set to be equal to (0.4, −0.5), (1.0, 0.0), and (1.6, 0.5), respectively.

DESCRIPTION OF THE PREFERRED EMBODIMENTS

The present invention will hereinbelow be described in further detail with reference to the accompanying drawings.

Figure 1:
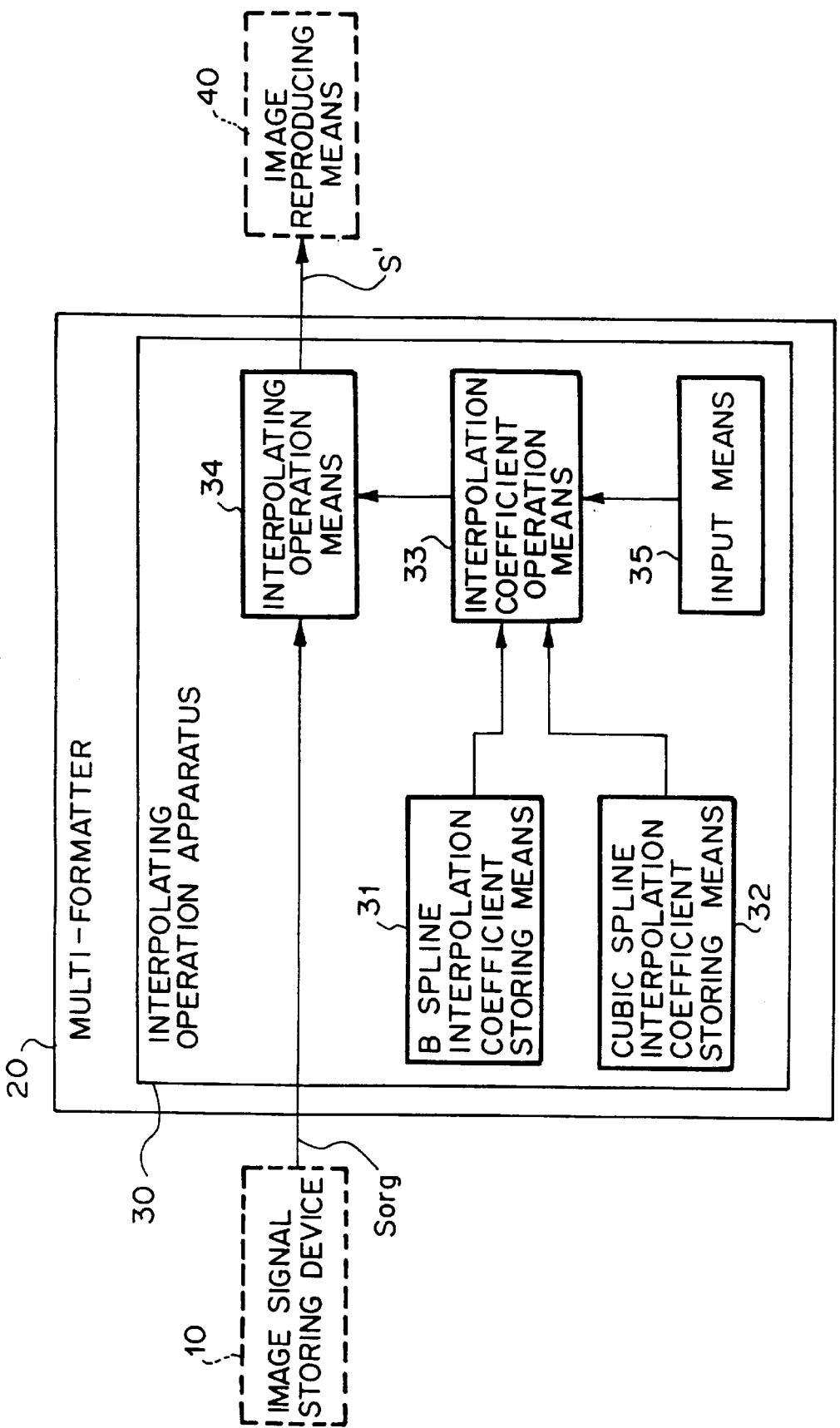
FIG. 1 is a schematic block diagram showing an image reproducing system provided with an embodiment of the interpolating operation apparatus for carrying out the interpolating operation method for an image signal in accordance with the present invention.

FIG. 1 is a schematic block diagram showing an image reproducing system provided with an interpolating operation apparatus 30, which is an embodiment of the interpolating operation apparatus for carrying out the interpolating operation method for an image signal in accordance with the present invention. With reference to FIG. 1, the image reproducing system comprises an image signal storing device 10 for storing an image signal Sorg representing an image, and a multi-formatter 20 for carrying out predetermined signal processing on the image signal (hereinbelow referred to as the primary image signal or the original image signal) Sorg, which is received from the image signal storing device 10, such that an image signal conforming to a predetermined reproduction format may be obtained. The image reproducing system also comprises an image reproducing means 40 for reproducing a visible image in the predetermined reproduction format from an image signal (hereinbelow referred to as the secondary image signal or the interpolation image signal) S', which has been obtained from the predetermined signal processing carried out by the multi-formatter 20.

The multi-formatter 20 carries out the signal processing on the primary image signal Sorg, such that an image signal conforming to one of various image reproduction formats may be obtained. Examples of the image reproduction formats include a format, in which the entire area of a single sheet of film is divided into four different small regions and four different images having reduced image sizes are printed respectively in the four regions, a format, in which a single large image is printed directly on a single sheet of film, and a format, in which a portion of an image is enlarged and the enlarged image portion is printed on a sheet of film. The multi-formatter 20 is provided with the interpolating operation apparatus 30 in accordance with the present invention, which carries out an interpolating operation for obtaining the secondary image signal (the interpolation image signal) made up of a number of image signal components different from that of the image signal components of the primary image signal Sorg when the image size is to be enlarged or reduced.

The primary image signal Sorg used in this embodiment is made up of a series of digital image signal components $Y_{k-2}, Y_{k-1}, Y_k, Y_{k+1}, Y_{k+2}, \ldots$ respectively corresponding to sampling points (picture elements) $X_{k-2}, X_{k-1}, X_k, X_{k+1}, X_{k+2}, \ldots$, which are sampled with a period of an equal interval and arrayed in one direction.

The interpolating operation apparatus 30, which is incorporated in the multi-formatter 20, comprises a cubic spline interpolation coefficient storing means 32, a B spline interpolation coefficient storing means 31, an interpolation coefficient operation means 33, an input means 35, and an interpolating operation means 34.

The cubic spline interpolation coefficient storing means 32 stores information representing interpolation coefficients $C_{k-1}, C_k, C_{k+1}$, and $C_{k+2}$, which respectively correspond to the original image signal components $Y_{k-1}, Y_k, Y_{k+1}$, and $Y_{k+2}$, in Formula (39). Formula (39) serves as a third-order cubic spline interpolating operation formula and represents a first secondary image signal component $Y_p1$ corresponding to an interpolation point $X_p$, which is located between original sampling points $X_k$ and $X_{k+1}$. The interpolation coefficients $C_{k-1}, C_k, C_{k+1}$, and $C_{k+2}$ are stored as being the ones represented by the formulas shown below.

$$Y_p1 = C_{k-1}Y_{k-1} + C_kY_k + C_{k+1}Y_{k+1} + C_{k+2}Y_{k+2} \tag{39}$$

$$C_{k-1} = (-t^3 + 2t^2 - t)/2$$

$$C_k = (3t^3 - 5t^2 + 2)/2$$

$$C_{k+1} = (-3t^3 + 4t^2 + t)/2$$

$$C_{k+2}=(t^3-t^2)/2$$

in which t, where $0 \geq t \geq 1$, represents the position of the interpolation point $X_p$, the position being taken with respect to the picture element $X_k$, that serves as a reference position, and in the direction heading toward the picture element $X_{k+1}$, the lattice interval being set to be equal to 1.

The B spline interpolation coefficient storing means 31 stores information representing interpolation coefficients $b_{k-1}, b_k, b_{k+1}$, and $b_{k+2}$, which respectively correspond to the original image signal components $Y_{k-1}, Y_k, Y_{k+1}$, and $Y_{k+2}$, in Formula (40). Formula (40) serves as a third-order B spline interpolating operation formula and represents a second secondary image signal component $Y_p2$ corresponding to the interpolation point $X_p$, which is located between original sampling points $X_k$ and $X_{k+1}$. The interpolation coefficients $b_{k-1}, b_k, b_{k+1}$, and $b_{k+2}$ are stored as being the ones represented by the formulas shown below.

$$Y_p2=b_{k-1}Y_{k-1}+b_kY_k+b_{k+1}Y_{k+1}+b_{k+2}Y_{k+2} \quad (40)$$

$$b_{k-1}=(-t^3+3t^2-3t+1)/6$$

$$b_k=(3t^3-6t^2+4)/6$$

$$b_{k+1}=(-3t^3+3t^2+3t+1)/6$$

$$b_{k+2}=t^3/6$$

in which t, where $0 \leq t \leq 1$, represents the position of the interpolation point $X_p$, the position being taken with respect to the picture element $X_k$, that serves as a reference position, and in the direction heading toward the picture element $X_{k+1}$, the lattice interval being set to be equal to 1.

The interpolation coefficient operation means 33 receives the interpolation coefficients (hereinbelow referred to as the cubic spline interpolation coefficients) $C_{k-1}, C_k, C_{k+1}$, and $C_{k+2}$ from the cubic spline interpolation coefficient storing means 32 and receives the interpolation coefficients (hereinbelow referred to as the B spline interpolation coefficients) $b_{k-1}, b_k, b_{k+1}$, and $b_{k+2}$ from the B spline interpolation coefficient storing means 31. The interpolation coefficient operation means 33 weights and adds the cubic spline interpolation coefficients $C_{k-1}, C_k, C_{k+1}$, and $C_{k+2}$ and the B spline interpolation coefficients $b_{k-1}, b_k, b_{k+1}$, and $b_{k+2}$, which coefficients correspond to each other and are set for the respective original image signal components $Y_{k-1}, Y_k, Y_{k+1}$, and $Y_{k+2}$. The weighted additions are carried out with Formulas (41), (42), (43), and (44):

$$\begin{aligned}
a_{k-1} &= (1-\alpha)c_{k-1} + \alpha b_{k-1} \quad &(41)\\
&= \{(2\alpha-3)t^3 - (3\alpha-6)t^2 - 3t + \alpha\}/6 \\
a_k &= (1-\alpha)c_k + \alpha b_k \quad &(42)\\
&= \{(9-6\alpha)t^3 + (9\alpha-15)t^2 + (6-2\alpha)\}/6 \\
a_{k+1} &= (1-\alpha)c_{k+1} + \alpha b_{k+1} \quad &(43)\\
&= \{(6\alpha-9)t^3 - (9\alpha-12)t^2 + 3t + \alpha\}/6 \\
a_{k+2} &= (1-\alpha)c_{k+2} + \alpha b_{k+2} \quad &(44)\\
&= \{(3-2\alpha)t^3 + (3\alpha-3)t^2\}/6
\end{aligned}$$

The input means 35 is used to input an arbitrary value of the parameter $\alpha$, which determines the weighting ratio, into the interpolation coefficient operation means 33.

The interpolating operation means 34 stores Formula (38) shown below as the operation formula with the third-order spline interpolating function and calculates the value of the interpolated image signal component $Y_p$, which corresponds to the interpolation point $X_p$, with Formula (38) in accordance with the interpolation coefficients $a_{k-1}, a_k, a_{k+1}$, and $a_{k+2}$ according to the parameter $\alpha$, which have been calculated by the interpolation coefficient operation means 33, and the original image signal components $Y_{k-1}, Y_k, Y_{k+1}$, and $Y_{k+2}$.

$$Y_p=a_{k-1}Y_{k-1}+a_kY_k+a_{k+1}Y_{k+1}+a_{k+2}Y_{k+2} \quad (38)$$

The cubic spline interpolation coefficients $C_{k-1}, C_k, C_{k+1}$, and $C_{k+2}$, which are stored in the cubic spline interpolation coefficient storing means 32, and the B spline interpolation coefficients $b_{k-1}, b_k, b_{k+1}$, and $b_{k+2}$, which are stored in the B spline interpolation coefficient storing means 31, are calculated previously with the algorithms described above. Also, the parameter $\alpha$ can take all real numbers, including the range more than 1 and the range less than 0.

An actual image is composed of the picture elements arrayed in two-dimensional directions. Therefore, the interpolation coefficients $a_{k-1}, a_k, a_{k+1}$, and $a_{k+2}$ are calculated for each of two different directions (an i direction and a j direction) of an array of the picture elements in the image. The interpolation coefficients $a_{k-1}, a_k, a_{k+1}$, and $a_{k+2}$ having been calculated in this manner are often represented as the interpolation coefficients Aij. The B spline interpolation coefficients $b_{k-1}, b_k, b_{k+1}$, and $b_{k+2}$, which have been calculated for each of the i direction and the j direction of the array of the picture elements in the image, are often represented as the interpolation coefficients Bij. Also, the cubic spline interpolation coefficients $C_{k-1}, C_k, C_{k+1}$, and $C_{k+2}$, which have been calculated for each of the i direction and the j direction of the array of the picture elements in the image, are often represented as the interpolation coefficients Cij.

In cases where the interpolation coefficient operation means 33 is caused to previously store Formulas (41), (42), (43), and (44), it can also serve as the B spline interpolation coefficient storing means 31 and the cubic spline interpolation coefficient storing means 32.

In the image reproducing system provided with this embodiment, the interpolation image signal S' obtained from the interpolating operation means 34 may be directly fed into the image reproducing means 40. Alternatively, the interval of the image signal components of the interpolation image signal S' may be extended such that it may become equal to the interval of the image signal components of the original image signal Sorg. In this manner, the interpolation image can be reproduced as an image enlarged from the original image. The enlargement processing is carried out with the functions of the multi-formatter 20. For this purpose, the multi-formatter 20 receives information, which represents a desired image size enlargement scale factor, from an input means (not shown).

How the image reproducing system provided with this embodiment operates will be described hereinbelow.

Firstly, the multi-formatter 20 reads the primary image signal Sorg from the image signal storing device 10. Also, in order to obtain the secondary image signal, which represents an enlarged image corresponding to the image size enlargement scale factor inputted from the input means (not shown), the multi-formatter 20 feeds the primary image signal Sorg into the interpolating operation apparatus 30 incorporated in the multi-formatter 20.

In the interpolating operation apparatus 30, the primary image signal Sorg is fed into the interpolating operation means 34.

The B spline interpolation coefficient storing means 31 and the cubic spline interpolation coefficient storing means 32 set the values of t in the respective interpolation coefficients in accordance with the image size enlargement scale factor having been inputted from the input means (not shown), which is connected to the multi-formatter 20. For example, in cases where an image size enlargement scale factor of 2 is inputted, values of 0.5 and 1.0 are set as the values of t. In cases where an image size enlargement scale factor of 4 is inputted, values of 0.25, 0.5, 0.75, and 1.0 are set as the values of t. In cases where an image size enlargement scale factor of 10 is inputted, values of 0.1, 0.2, . . . , 1.0 are set as the values of t. Information representing the B spline interpolation coefficients and the cubic spline interpolation coefficients, which are for each of the thus set values of t, is fed into the interpolation coefficient operation means 33.

Also, information representing a value of the parameter (i. e., the coefficient) α corresponding to a level of sharpness desired for the secondary image is inputted into the input means 35. The information representing the value of the parameter α is also fed into the interpolation coefficient operation means 33.

The information representing the value of the parameter α may be directly inputted by an operator from the exterior. Alternatively, information representing the response R, which corresponds to the level of sharpness desired for the interpolation image, may be inputted by the operator, and the response R may be converted into the parameter α in the input means 35.

In order for the input means 35 to be provided with the functions for receiving the response R and converting it into the parameter α, the input means 35 may be provided with the constitution illustrated in FIG. 3.

Figure 5A:
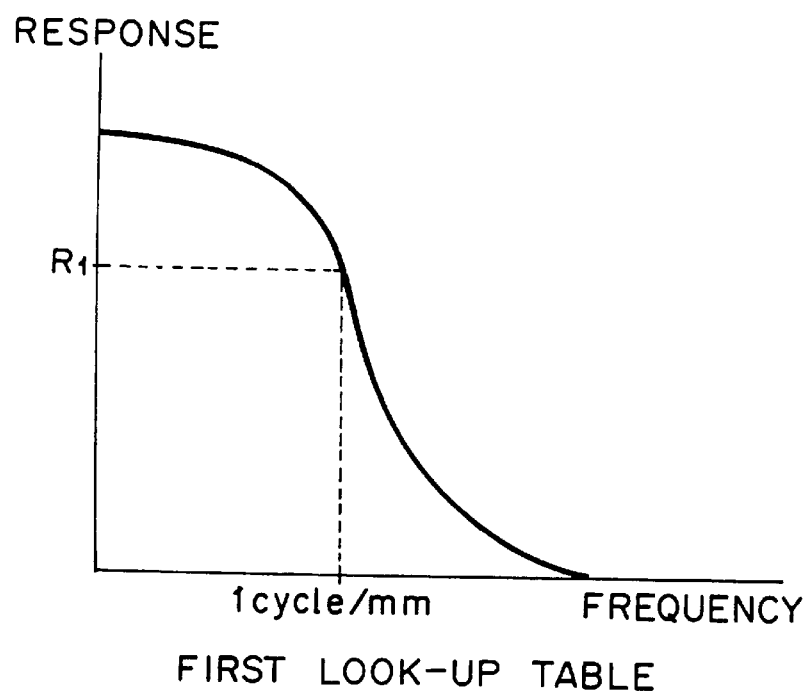
FIG. 5A is a schematic graph showing an example of a first look-up table, the graph serving as an aid in explaining the relationship between a frequency and a response.
Figure 5B:
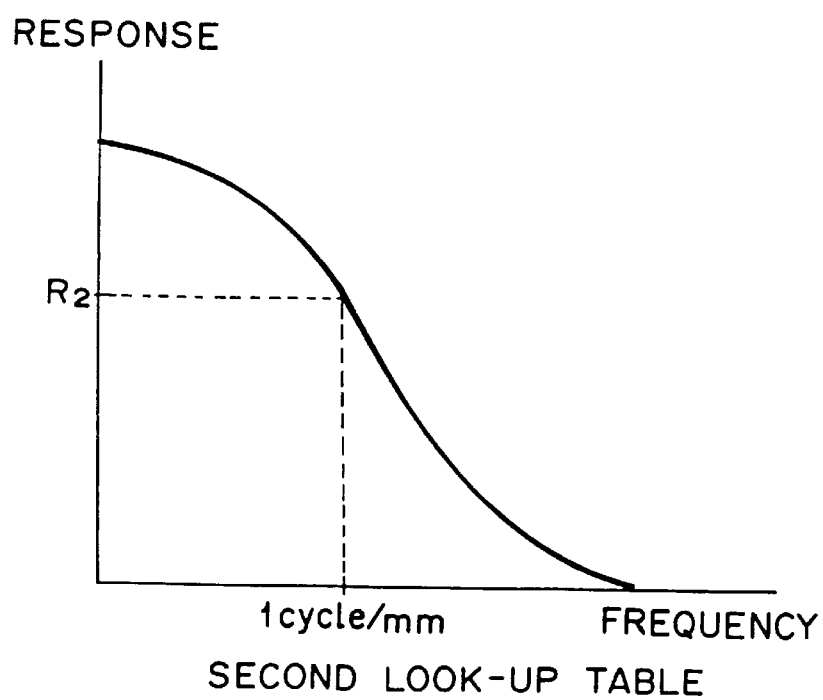
FIG. 5B is a schematic graph showing an example of a second look-up table, the graph serving as an aid in explaining the relationship between a frequency and a response.

Specifically, the input means 35 illustrated in FIG. 3 is provided with a response input means 35a, from which the response R desired for the interpolation image is inputted by the operator. The input means 35 is also provided with six kinds of first look-up tables 35b, each of which has the function pattern shown in, for example, FIG. 5A. Each of the first look-up tables 35b sets the frequencies and the corresponding responses $R_1$ with respect to the cubic spline interpolating function, which is represented by Formula (39), and for each of a plurality of different image size enlargement scale factors (e.g., enlargement scale factors of 1.0, 1.2, . . . , 1.8, and 2.0). The input means 35 is further provided with six kinds of second look-up tables 35c, each of which has the function pattern shown in, for example, FIG. 5B. Each of the second look-up tables 35c sets the frequencies and the corresponding responses $R_2$ with respect to the B spline interpolating function, which is represented by Formula (40), and for each of a plurality of different image size enlargement scale factors (e.g., enlargement scale factors of 1.0, 1.2, . . . , 1.8, and 2.0). The input means 35 is still further provided with a coefficient calculating means 35d. The coefficient calculating means 35d calculates a response $R_1$ of the cubic spline interpolating function with respect to an image size enlargement scale factor, which is desired for an interpolation image, and a response $R_2$ of the B spline interpolating function with respect to the image size enlargement scale factor, which is desired for the interpolation image, by making reference to one of the first look-up tables 35b and one of the second look-up tables 35c, which correspond to the image size enlargement scale factor desired for the interpolation image. The coefficient calculating means 35d also calculates the parameter α from an operation carried out with Formula (5):

$$\alpha = (R - R_1)/(R_2 - R_1) \quad (5)$$

in accordance with the response R desired for the interpolation image and the calculated responses $R_1$, $R_2$.

The first look-up tables 35b and the second look-up tables 35c are stored in a single data base.

In cases where the input means 35 is constituted in the manner described above, it becomes possible to specify the response R, with which the extent of the change in the sharpness can be grasped as an actual feeling.

The image size enlargement scale factor, for which the response $R_1$ of the cubic spline interpolating function and the response $R_2$ of the B spline interpolating function are calculated, is a desired image size enlargement scale factor, which is inputted from the input means (not shown) into the multi-formatter 20.

The information representing the parameter α, which has been inputted directly or has been calculated from the inputted response R, is fed into the interpolation coefficient operation means 33.

The interpolation coefficient operation means 33 calculates the new interpolation coefficients $a_{k-1}$, $a_k$, $a_{k+1}$, and $a_{k+2}$ for each of the values of t according to the value of the parameter α from the received B spline interpolation coefficients and the received cubic spline interpolation coefficients, which are for each of the values of t, and the parameter α. The calculations are carried out with Formulas (41), (42), (43), and (44).

The information representing the calculated new interpolation coefficients $a_{k-1}$, $a_k$, $a_{k+1}$, and $a_{k+2}$ is fed into the interpolating operation means 34.

The interpolating operation means 34 calculates the value of the interpolated image signal component $Y_p$, which corresponds to the interpolation point $X_p$, with Formula (38), which is stored therein and serves as the operation formula with the third-order spline interpolating function, in accordance with the interpolation coefficients $a_{k-1}$, $a_k$, $a_{k+1}$, and $a_{k+2}$, which have been received from the interpolation coefficient operation means 33, and the original image signal components $Y_{k-1}$, $Y_k$, $Y_{k+1}$, and $Y_{k+2}$, which have been received from the image signal storing device 10.

The thus obtained interpolation image signal S' containing the interpolated image signal components, which correspond to all interpolation points, is fed into the image reproducing means 40.

The image reproducing means 40 reproduces a visible image from the received interpolation image signal S'. The sharpness of the reproduced visible image can be adjusted easily by merely changing the value of the inputted parameter α. In cases where a negative value less than 0 is inputted as the value of the parameter α, an image having a sharpness higher than the sharpness of the secondary image, which is obtained with the ordinary cubic spline interpolating operation, can be obtained. In cases where a value larger than 1 is inputted as the value of the parameter α, a smooth image having a sharpness lower than the sharpness of the secondary image, which is obtained with the ordinary B spline interpolating operation, can be obtained. Also, in cases where the parameter α is set to be equal to a value larger than 0 and smaller than 1, an image having a sharpness, which is intermediate between the sharpness of the secondary image obtained with the cubic spline interpolating operation and the sharpness of the secondary image obtained with the B spline interpolating operation, can be obtained. In cases where the input means 35 has the constitution for inputting the desired response R, the desired response R can be changed and inputted into the response input means 35. In this manner, the value of the parameter α can be changed, and the adjustment of the sharpness can be carried out easily.

In the image reproducing system provided with this embodiment, the interpolating operation apparatus 30 utilizes the primary image signal having been previously stored in the image signal storing device 10. However, the interpolating operation apparatus in accordance with the present invention is not limited to this embodiment. For example, an image signal representing an image, which has been detected by using an image read-out apparatus illustrated in FIG. 2, may be utilized.

Specifically, with the image read-out apparatus illustrated in FIG. 2, an X-ray image of an object, which has been stored on a stimulable phosphor sheet 100, is read from the stimulable phosphor sheet 100.

The stimulable phosphor sheet 100, on which the X-ray image has been stored, is placed at a predetermined position in a read-out means 50 of an X-ray image read-out apparatus. The stimulable phosphor sheet 100 is then conveyed in a sub-scanning direction, which is indicated by the arrow Y, by an endless belt 52, which is operated by a motor 51. A laser beam 54, which serves as stimulating rays, is produced by a laser beam source 53. The laser beam 54 is reflected and deflected by a rotating polygon mirror 56, which is quickly rotated by a motor 55 in the direction indicated by the arrow. The laser beam 54 then passes through a converging lens 57, which may be constituted of an fθ lens, or the like. The direction of the optical path of the laser beam 54 is then changed by a mirror 58, and the laser beam 54 impinges upon the stimulable phosphor sheet 100 and scans it in a main scanning direction indicated by the arrow X, which direction is approximately normal to the sub-scanning direction indicated by the arrow Y. When the stimulable phosphor sheet 100 is exposed to the laser beam 54, the exposed portion of the stimulable phosphor sheet 100 emits light 59 in an amount proportional to the amount of energy stored thereon during its exposure to the X-rays. The emitted light 59 is guided by a light guide member 60 and photoelectrically detected by a photomultiplier 61.

The light guide member 60 is made from a light guiding material, such as an acrylic plate. The light guide member 60 has a linear light input face 60a, which is positioned so that it extends along the main scanning line on the stimulable phosphor sheet 100, and a ring-shaped light output face 60b, which is positioned so that it is in close contact with a light receiving face of the photomultiplier 61. The emitted light 59, which has entered the light guide member 60 at its light input face 60a, is guided through repeated total reflection inside of the light guide member 60, emanates from the light output face 60b, and is received by the photomultiplier 61. In this manner, the amount of the emitted light 59, which amount represents the X-ray image, is converted into an electric signal by the photomultiplier 61.

An analog output signal S is generated by the photomultiplier 61. The analog output signal S is logarithmically amplified by a logarithmic amplifier 62, and digitized by an analog-to-digital converter 63. In this manner, an original (primary) image signal Dorg is obtained. The original image signal Dorg is fed into the aforesaid multi-formatter 20.

As described above, the primary image signal, which is utilized in the interpolating operation apparatus 30 in accordance with the present invention may be the one, which has been previously stored in the image signal storing device 10, or may be the one, which is obtained by reading out an image with the image read-out apparatus illustrated in FIG. 2.

Embodiments of spline interpolating operation apparatuses for carrying out the spline interpolating operation methods for an image signal in accordance with the present invention will be described hereinbelow.

FIG. 6 is a schematic block diagram showing an image reproducing system provided with an interpolating operation apparatus 130, which is an embodiment of the spline interpolating operation apparatus for carrying out the spline interpolating operation method for an image signal in accordance with the present invention. With reference to FIG. 6, the image reproducing system comprises an image signal storing device 10 for storing an image signal Sorg representing an image, and a multi-formatter 120 for carrying out predetermined signal processing on the image signal (hereinbelow referred to as the primary image signal or the original image signal) Sorg, which is received from the image signal storing device 10, such that an image signal conforming to a predetermined reproduction format may be obtained. The image reproducing system also comprises an image reproducing means 40 for reproducing a visible image in the predetermined reproduction format from an image signal (hereinbelow referred to as the secondary image signal or the interpolation image signal) S', which has been obtained from the predetermined signal processing carried out by the multi-formatter 120.

The multi-formatter 120 carries out the signal processing on the primary image signal Sorg, such that an image signal conforming to one of various image reproduction formats may be obtained. Examples of the image reproduction formats include a format, in which the entire area of a single sheet of film is divided into four different small regions and four different images having reduced image sizes are printed respectively in the four regions, a format, in which a single large image is printed directly on a single sheet of film, and a format, in which a portion of an image is enlarged and the enlarged image portion is printed on a sheet of film. The multi-formatter 120 is provided with the interpolating operation apparatus 130 in accordance with the present invention, which carries out an interpolating operation for obtaining the secondary image signal (the interpolation image signal) made up of a number of image signal components different from that of the image signal components of the primary image signal Sorg when the image size is to be enlarged or reduced.

Figure 7:
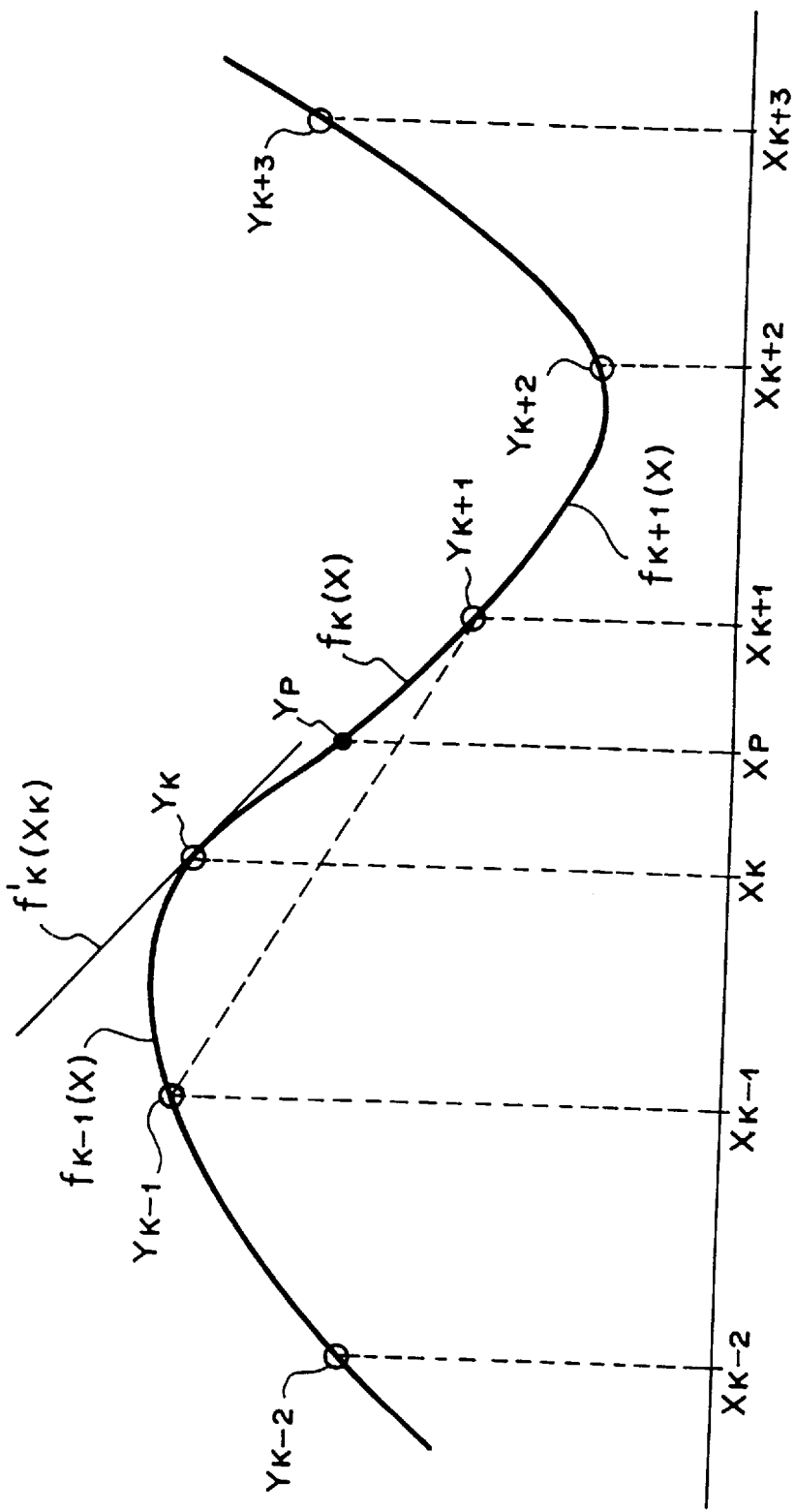
FIG. 7 is an explanatory graph showing how interpolated image signal components are obtained from original image signal components, which are sampled with a period of an equal interval and represent sampling points (picture elements) arrayed in one direction, in the embodiment of the spline interpolating operation apparatus.

As illustrated in FIG. 7, the primary image signal Sorg used in this embodiment is made up of a series of digital image signal components $Y_{k-2}$, $Y_{k-1}$, $Y_k$, $Y_{k+1}$, $Y_{k+2}$, . . . respectively corresponding to sampling points (picture elements) $X_{k-2}$, $X_{k-1}$, $X_k$, $X_{k+1}$, $X_{k+2}$, . . . , which are sampled with a period of an equal interval and arrayed in one direction. In FIG. 7, the digital image signal components $Y_{k-1}$, $Y_k$, $Y_{k+1}$, and $Y_{k+2}$ are indicated by white dots.

The interpolating operation apparatus 130, which is incorporated in the multi-formatter 120, comprises a storage means 131, an input means 132, an interpolation coefficient operation means 133, and an interpolating operation means 134.

The storage means 131 stores information representing interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$, in Formula (6). Formula (6) serves as a third-order spline interpolating operation formula and represents a secondary image signal component $Y_p1$ corresponding to an interpolation point $X_p$, which is located between original sampling points $X_k$ and $X_{k+1}$. The interpolation coefficients $a_{k-1}$, $a_k$, $a_{k+1}$, and $a_{k+2}$ are stored as being the ones represented by Formulas (13), (14), (15), and (16).

$$Y_p = a_{k-1}Y_{k-1} + a_k Y_k + a_{k+1}Y_{k+1} + a_{k+2}Y_{k+2} \tag{6}$$

$$a_{k-1} = -(\alpha/2)t(t-1)^2 \tag{13}$$

$$a_k = (2-\alpha/2)t^3 - (3-/2)t^2 + 1 \tag{14}$$

$$a_{k+1}=(\alpha/2-2)t^3+(3-\alpha)t^2+(\alpha/2)t \quad (15)$$

$$a_{k+2}=(\alpha/2)t^2(t-1) \quad (16)$$

in which α represents the parameter determining the sharpness of the secondary image represented by the interpolation image iia signal, and t, where 0≦t<1, represents the position of the interpolation point $X_p$, the position being taken with respect a to the picture element $X_k$, that serves as a reference position, and in the direction heading toward the picture element $X_{k+1}$, the lattice interval of the original image signal components being set to be equal to 1.

The input means 132 is used to input the arbitrary parameter α, which determines the sharpness of the secondary image reproduced from the interpolation image signal.

The interpolation coefficient operation means 133 calculates the interpolation coefficients $a_{k-1}$, $a_k$, $a_{k+1}$, and $a_{k+2}$ in accordance with the parameter α, the calculation being carried out from the interpolation coefficients, which are stored in the storage means 131, and the parameter α inputted from the input means 132.

The interpolating operation means 134 stores Formula (6) shown above as the operation formula with the third-order spline interpolating function and calculates the value of the interpolated image signal component $Y_p$, which corresponds to the interpolation point $X_p$, with Formula (6) in accordance with the interpolation coefficients $a_{k-1}$, $a_k$, $a_{k+1}$, and $a_{k+2}$ according to the parameter α, which have been calculated by the interpolation coefficient operation means 133, and the original image signal components $Y_{k-1}$, $Y_k$, $Y_{k+1}$, and $Y_{k+2}$.

The interpolation coefficients $a_{k-1}$, $a_k$, $a_{k+1}$, and $a_{k+2}$, which are stored in the storage means 131, are calculated previously with the algorithms described below.

Specifically, as illustrated in FIG. 7, the image signal components (the original image signal components), which represent a series of picture elements $X_{k-2}$, $X_{k-1}$, $X_k$, $X_{k+1}$, $X_{k+2}$, ..., are respectively represented by $Y_{k-2}$, $Y_{k-1}$, $Y_k$, $Y_{k+1}$, $Y_{k+2}$, ... The third-order spline interpolating function is set for each of sections $X_{k-2} \sim X_{k-1}$, $X_{k-1} \sim X_k$, $X_k \sim X_{k+1}$, and $X_{k+1} \sim X_{k+2}$. The spline interpolating functions corresponding to the respective sections are represented by $f_{k-2}$, $f_{k-1}$, $f_k$, $f_{k+1}$, and $f_{k+2}$. The interpolating functions are the third-order functions, in which the position in each section serves as a variable.

Firstly, in cases where the point taken for interpolation (i.e, the interpolation point) $X_p$ falls within the section $X_k \sim X_{k+1}$, the spline interpolating function $f_k$ corresponding to the section $X_k \sim X_{k+1}$ is represented by Formula (29).

$$f_k(x)=A_k x^3+B_k x^2+C_k x+D_k \quad (29)$$

In the operation formula, Formula (29), the conditions should be satisfied in that the spline interpolating function $f_k$ should pass through the original sampling points (picture elements), and in that the first-order differential coefficient of the spline interpolating function $f_k$ should be continuous between adjacent sections. From such conditions, Formulas (7), (8), (9), and (10) are derived.

$$f_k(X_k)=Y_k \quad (7)$$

$$f_k(X_{k+1})=Y_{k+1} \quad (8)$$

$$f_k'(X_k)=f_{k-1}'(X_k) \quad (9)$$

$$f_k'(X_{k+1})=f_{k+1}'(X_{k+1}) \quad (10)$$

In these formulas, $f_k'$ represents the first-order differentiation $(3A_k x^2+2B_k x+C_k)$ of the function $f_k$.

Also, the condition should be satisfied in that the first-order differential coefficient of the spline interpolating function $f_k$ at the picture element $X_k$ should have a predetermined inclination α with respect to the gradient $(Y_{k+1}-Y_{k-1})/(X_{k+1}-X_{k-1})$ of the original image signal components $Y_{k-1}$ and $Y_{k+1}$ representing the picture elements $X_{k-1}$ and $X_{k+1}$, which are located before and after the picture element $X_k$. Therefore, it is necessary for Formula (11) to be satisfied:

$$f_k'(X_k)=\alpha(Y_{k+1}-Y_{k-1})/(X_{k+1}-X_{k-1}) \quad (11)$$

Further, the condition should be satisfied in that the first-order differential coefficient of the spline interpolating function $f_k$ at the picture element $X_{k+1}$ should have the predetermined inclination α with respect to the gradient $(Y_{k+2}-Y_k)/(X_{k+2}-X_k)$ of the original image signal components $Y_k$ and $Y_{k+2}$ representing the picture elements $X_k$ and $X_{k+2}$, which are located before and after the picture element $X_{k+1}$. Therefore, it is necessary for Formula (12) to be satisfied:

$$f_k'(X_{k+1})=\alpha(Y_{k+2}-Y_k)/(X_{k+2}-X_k) \quad (12)$$

The interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is herein set to be equal to 1. Also, the position of the interpolation point $X_p$, which is taken from the picture element $X_k$ in the direction heading toward the picture element $X_{k+1}$, is represented by t (0≦t<1). In such cases, from Formulas (7), (8), (9), (10), (11), and (12), the formulas shown below obtain.

$$f_k(0)=D_k=Y_k$$

$$f_k(1)=A_k+B_k+C_k+D_k=Y_{k+1}$$

$$f_k'(0)=C_k=\alpha(Y_{k+1}-Y_{k-1})/2$$

$$f_k'(1)=3A_k+2B_k+C_k=\alpha(Y_{k+2}-Y_k)/2$$

Therefore, the formulas shown below obtain.

$$A_k=(\alpha/2)Y_{k+2}+(\alpha/2-2)Y_{k+1}+(2-\alpha/2)Y_k-(\alpha/2)Y_{k-1}$$

$$B_k=-(\alpha/2)Y_{k+2}+(3-\alpha)Y_{k+1}+(\alpha/2-3)Y_k+\alpha Y_{k-1}$$

$$C_k=(\alpha/2)Y_{k+1}-(\alpha/2)Y_{k-1}$$

$$D_k=Y_k$$

As described above, the variable conversion of X=t is carried out, and therefore the spline interpolating function $f_k(X)$ is represented by the formula shown below.

$$f_k(x)=f_k(t)$$

Therefore, an interpolated image signal component $Y_p$ corresponding to the interpolation point $X_p$ may be represented by Formula (30).

$$Y_p=f_k(t)=A_k t^3+B_k t^2+C_k t+D_k \quad (30)$$

Substituting the coefficients $A_k$, $B_k$, $C_k$, and $D_k$ into Formula (30) yields $$Y_p = \{(\alpha/2)Y_{k+2} + (\alpha/2 - 2)Y_{k+1} + (2 - \alpha/2)Y_k - (\alpha/2)Y_{k-1}\}t^3 +$$

$$\{-(\alpha/2)Y_{k+2} + (3 - \alpha)Y_{k+1} + (\alpha/2 - 3)Y_k + \alpha Y_{k-1}\}t^2 +$$

$$\{(\alpha/2)Y_{k+1} - (\alpha/2)Y_{k-1}\}t + Y_k$$

Arranging this formula with respect to the image signal components $a_{k-1}$, $Y_k$, $Y_{k+1}$, and $Y_{k+2}$ yields Formula (45).

$$Y_p = \{\alpha t(t-1)^2/2\}Y_{k-1} + \{(2-\alpha/2)t^3 + (\alpha/2 - 3)t^2 + 1\}Y_k + \qquad (45)$$

$$\{(\alpha/2 - 2)t^3 + (3 - \alpha)t^2 + \alpha t/2\}Y_{k+1} + \{-\alpha t^2(t-1)/2\}Y_{k+2}$$

The interpolation coefficients $a_{k-1}$, $a_k$, $a_{k+1}$, and $a_{k+2}$ corresponding to the original image signal components $Y_{k-1}$, $Y_k$, $Y_{k+1}$, and $Y_{k+2}$ are calculated with the algorithms described above.

The interpolation coefficient operation means 133 calculates the values of the interpolation coefficients $a_{k-1}$, $a_k$, $a_{k+1}$, and $a_{k+2}$, which coefficients have been stored in the storage means 131, in accordance with an arbitrary parameter α, which corresponds to a desired level of sharpness and has been inputted from the input means 132.

As will be understood from Formulas (11) and (12) and FIG. 7, as the value of the parameter α is set to be larger, the contrast of the secondary image becomes higher, and an image having a higher sharpness is obtained. As the value of the parameter α is set to be smaller, the contrast of the secondary image becomes lower, and a smoother image having a lower sharpness is obtained.

An actual image is composed of the picture elements arrayed in two-dimensional directions. Therefore, the parameter t, which is used in the aforesaid interpolation coefficient formulas, may be replaced by $t_x$ with respect to one of the two directions in the array and may be replaced by $t_y$ with respect to the other direction in the array. The interpolation coefficients may thus be determined for each of the directions in the array. In this specification, as an aid in facilitating the explanation, the operation is described with respect to only one of the two directions in the array of the picture elements.

How the image reproducing system provided with this embodiment operates will be described hereinbelow.

Firstly, the multi-formatter 120 reads the primary image signal Sorg from the image signal storing device 10. Also, in order to obtain the secondary image signal, which represents an enlarged image corresponding to the image size enlargement scale factor inputted from the input means (not shown), the multi-formatter 120 feeds the primary image signal Sorg into the interpolating operation apparatus 130 incorporated in the multi-formatter 120.

In the interpolating operation apparatus 130, the primary image signal Sorg is fed into the interpolating operation means 134.

The storage means 131 sets the values of t in Formulas (13), (14), (15), and (16) in accordance with the image size enlargement scale factor having been inputted from a different input means (not shown). For example, in cases where an image size enlargement scale factor of 2 is inputted, values of 0.0 and 0.5 are set as the values of t. In cases where an image size enlargement scale factor of 4 is inputted, values of 0.0, 0.25, 0.5, and 0.75 are set as the values of t. In cases where an image size enlargement scale factor of 10 is inputted, values of 0.0, 0.1, 0.2, . . . , 0.9 are set as the values of t. Information representing the interpolation coefficients $a_{k-1}$, $a_k$, $a_{k+1}$, and $a_{k+2}$, which are represented by Formulas (13), (14), (15), and (16) and are for each of the thus set values of t, is fed into the interpolation coefficient operation means 133.

Also, information representing a value of the parameter α corresponding to a level of sharpness desired for the secondary image is inputted into the input means 132. The information representing the value of the parameter α is also fed into the interpolation coefficient operation means 133.

The interpolation coefficient operation means 133 calculates the interpolation coefficients $a_{k-1}$, $a_k$, $a_{k+1}$, and $a_{k+2}$ for each of the values of t according to the value of the parameter α from the received interpolation coefficients $a_{k-1}$, $a_k$, $a_{k+1}$, and $a_{k+2}$, which are for each of the values of t, and the parameter α. The calculations are carried out with Formulas (13), (14), (15), and (16).

The information representing the calculated interpolation coefficients $a_{k-1}$, $a_k$, $a_{k+1}$, and $a_{k+2}$ is fed into the interpolating operation means 134.

The interpolating operation means 134 calculates the value of the interpolated image signal component $Y_p$, which corresponds to the interpolation point $X_p$, with Formula (6), which is stored therein and serves as the operation formula with the third-order spline interpolating function, in accordance with the interpolation coefficients $a_{k-1}$, $a_k$, $a_{k+1}$, and $a_{k+2}$, which have been received from the interpolation coefficient operation means 133, and the original image signal components $Y_{k-1}$, $Y_k$, $Y_{k+1}$, and $Y_{k+2}$, which have been received from the image signal storing device 10.

The thus obtained interpolation image signal S' containing the interpolated image signal components, which correspond to all interpolation points, is fed into the image reproducing means 40.

The image reproducing means 40 reproduces a visible image from the received interpolation image signal S'. The sharpness of the reproduced visible image can be adjusted easily by merely changing the value of the inputted parameter α. Specifically, with this embodiment of the spline interpolating operation apparatus for an image signal in accordance with the present invention, wherein two or more kinds of spline interpolating operations are not combined with one another, the sharpness can be adjusted easily. Also, the value of the parameter α can be set freely, and therefore the degree of freedom of the sharpness adjustment can be kept high.

Figures 8A, 8B, 8C:
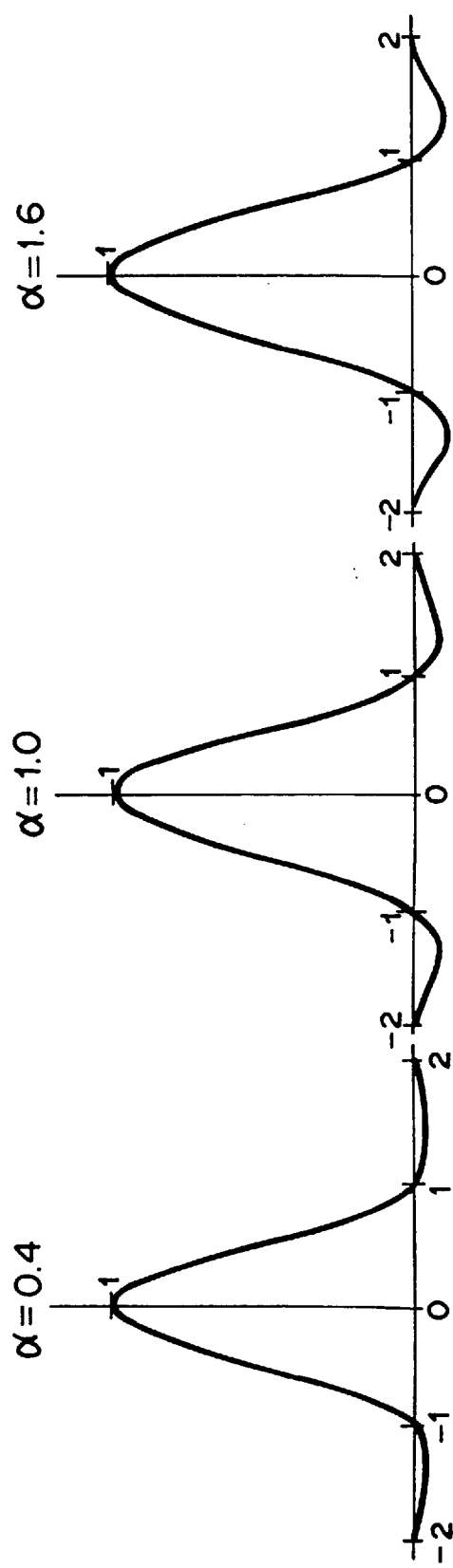
FIGS. 8A, 8B, and 8C are graphs showing interpolation coefficients obtained when the value of a parameter α is set to be equal to 0.4, 1.0, and 1.6, respectively.

FIGS. 8A, 8B, and 8C show the graphs of the interpolation coefficients obtained when the value of the parameter α is set to be equal to 0.4, 1.0, and 1.6, respectively.

In the image reproducing system provided with this embodiment of the spline interpolating operation apparatus for an image signal in accordance with the present invention, the interpolating operation apparatus 130 utilizes the primary image signal having been previously stored in the image signal storing device 10. However, the spline interpolating operation apparatus in accordance with the present invention is not limited to this embodiment. For example, an image signal representing an image, which has been detected by using an image read-out apparatus illustrated in FIG. 2, may be utilized.

As described above, the primary image signal, which is utilized in the interpolating operation apparatus 130 in accordance with the present invention may be the one, which has been previously stored in the image signal storing device 10, or may be the one, which is obtained by reading out an image with the image read-out apparatus illustrated in FIG. 2.

Also, in this embodiment of the spline interpolating operation apparatus for an image signal in accordance with the present invention, the information representing the interpolation coefficients, which are represented by Formulas (13), (14), (15), and (16), are stored in the storage means 131. Alternatively, as the interpolation coefficients, for example, those represented by Formulas (21), (22), (23), and (24) shown below may be employed.

$$a_{k-1} = -(\beta+1/2)t^3 + (3\beta/2+1)t^2 - (1/2)t - /2 \qquad (21)$$

$$a_k = 3(\beta+1/2)t^3 - (9\beta/2+5/2)t^2 + \beta + 1 \qquad (22)$$

$$a_{k-1} = -3(\beta+1/2)t^3 + (9\beta/2+2)t^2 + (1/2)t - \beta/2 \qquad (23)$$

$$a_{k-2}=(\beta+1/2)t^3-(3\beta/2+1/2)t^2 \quad (24)$$

In Formulas (21), (22), (23), and (24), $\beta$ represents an arbitrary parameter, which determines the sharpness of the secondary image represented by the interpolation image signal. In lieu of the aforesaid parameter $\alpha$, the parameter $\beta$ is inputted from the input means 132. The interpolation coefficients $a_{k-1}$, $a_k$, $a_{k+1}$, and $a_{k+2}$ are calculated previously with the algorithms described below.

Specifically, as illustrated in FIG. 7, the image signal components (the original image signal components), which represent a series of picture elements $X_{k-2}$, $X_{k-1}$, $X_k$, $X_{k+1}$, $X_{k+2}$, ..., are respectively represented by $Y_{k-2}$, $Y_{k-1}$, $Y_k$, $Y_{k+1}$, $Y_{k+2}$, ... The third-order spline interpolating function is set for each of sections $X_{k-2} \sim X_{k-1}$, $X_{k-1} \sim X_k$, $X_k \sim X_{k+1}$, and $X_{k+1} \sim X_{k+2}$. The spline interpolating functions corresponding to the respective sections are represented by $f_{k-2}$, $f_{k-1}$, $f_k$, $f_{k+1}$, and $f_{k+2}$. The interpolating functions are the third-order functions, in which the position in each section serves as a variable.

Firstly, in cases where the point taken for interpolation (i.e, the interpolation point) $X_p$ falls within the section $X_k \sim X_{k+1}$, the spline interpolating function $f_k$ corresponding to the section $X_k \sim X_{k+1}$ is represented by Formula (29).

$$f_k(x)=A_k x^3+B_k x^2+C_k x+D_k \quad (29)$$

In the operation formula, Formula (29), the conditions should be satisfied in that the spline interpolating function $f_k$ should slightly deviate from the original sampling points (picture elements) in order to carry out an smooth interpolating operation, and in that a non-uniform density portion should not occur in the interpolation image, which is obtained from the interpolating operation carried out on an original image having uniform density distribution. From such conditions, Formulas (17) and (18) are derived.

$$f_k(X_k)=-0.5\beta Y_{k-1}+(1+\beta)Y_k-0.5\beta Y_{k+1} \quad (17)$$

$$f_k(X_{k+1})=-0.5\beta Y_k+(1+\beta)Y_{k+1}-0.5\beta Y_{k+2} \quad (18)$$

The parameter $\beta$ in Formulas (17) and (18) are the parameter, which determines the sharpness of the secondary image represented by the interpolation image signal. Formulas (17) and (18) mean that the secondary image signal components corresponding to the points $X_k$ and $X_{k+1}$ at both ends of the section $X_k \sim X_{k+1}$ are raised or lowered by the inputted value of $\beta$ from the original image signal components, and that halves of $\beta$ are allocated to the adjacent points on both sides and each of the original image signal components on both sides is subtracted by the amount of contribution of the allocation.

From the condition in that the first-order differential coefficient of the spline interpolating function $f_k$ should be continuous between adjacent sections, Formulas (9) and (10) are derived.

$$f_k'(X_k)=f_{k-1}'(X_k) \quad (9)$$

$$f_k'(X_{k+1})=f_{k+1}'(X_{k+1}) \quad (10)$$

Also, the condition should be satisfied in that the first-order differential coefficient of the spline interpolating function $f_k$ at the picture element $X_k$ should coincide with the gradient $(Y_{k+1}-Y_{k-1})/(X_{k+1}-X_{k-1})$ of the original image signal components $Y_{k-1}$ and $Y_{k+1}$ representing the picture elements $X_{k-1}$ and $X_{k+1}$, which are located before and after the picture element $X_k$. Therefore, it is necessary for Formula (19) to be satisfied.

$$f_k'(X_k)=(Y_{k+1}-Y_{k-1})/(X_{k+1}-X_{k-1}) \quad (19)$$

Further, the condition should be satisfied in that the first-order differential coefficient of the spline interpolating function $f_k$ at the picture element $X_{k+1}$ should coincide with the gradient $(Y_{k+2}-Y_k)/(X_{k+2}-X_k)$ of the original image signal components $Y_k$ and $Y_{k+2}$ representing the picture elements $X_k$ and $X_{k+2}$, which are located before and after the picture element $X_{k+1}$. Therefore, it is necessary for Formula (20) to be satisfied.

$$f_k'(X_{k+1})=(Y_{k+2}-Y_k)/(X_{k+2}-X_k) \quad (20)$$

The interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is herein set to be equal to 1. Also, the position of the interpolation point $X_p$, which is taken from the picture element $X_k$ in the direction heading toward the picture element $X_{k+1}$, is represented by t ($0 \leq t < 1$). In such cases, from Formulas (9), (10), (17), (18), (19), and (20), the formulas shown below obtain.

$$f_k(0)=D_k=-0.5\beta Y_{k-1}+(1+\beta)Y_k-0.5\beta Y_{k+1}$$

$$f_k(1)=A_k+B_k+C_k+D_k=-0.5\beta Y_k+(1+\beta) Y_{k+1}-0.5\beta Y_{k+2}$$

$$f_k'(0)=C_k=(Y_{k+1}-Y_{k-1})/2$$

$$f_k'(1)=3A_k+2B_k+C_k=(Y_{k+2}-Y_k)/2$$

Therefore, the formulas shown below obtain.

$$A_k = (1/2+\beta)Y_{k+2} - (3/2+3\beta)Y_{k+1} + (3\beta+3/2)Y_k - (\beta+1/2)Y_{k-1}$$

$$B_k = -(1/2+3\beta/2)Y_{k+2} + (9\beta/2+2)Y_{k+1} - (9\beta/2+5/2)Y_k + (1+3\beta/2)Y_{k-1}$$

$$C_k = (1/2)Y_{k+1} - (1/2)Y_{k-1}$$

$$D_k = -(\beta/2)Y_{k+1} + (1+\beta)Y_k - (\beta/2)Y_{k-1}$$

As described above, the variable conversion of X=t is carried out, and therefore the spline interpolating function $f_k(X)$ is represented by the formula shown below.

$$f_k(x)=f_k(t)$$

Therefore, an interpolated image signal component $Y_p$ corresponding to the interpolation point $X_p$ may be represented by Formula (30).

$$Y_p=f_k(t)=A_k t^3+B_k t^2+C_k t+D_k \quad (30)$$

Substituting the coefficients $A_k$, $B_k$, $C_k$, and $D_k$ into Formula (30) yields $$Y_p = \{(1/2+\beta)Y_{k+2} - (3/2+3\beta)Y_{k+1} + (3\beta+3/2)Y_k - (\beta+1/2)Y_{k-1}\}t^3 +$$
$$\{-(1/2+3\beta/2)Y_{k+2} + (9\beta/2+2)Y_{k+1} - (9\beta/2+5/2)Y_k + (1+3\beta/2)Y_{k-1}\}t^2 + \{(1/2)Y_{k+1} - (1/2)Y_{k-1}\}t +$$
$$\{-(\beta/2)Y_{k+1} + (1+\beta)Y_k - (\beta/2)Y_{k-1}\}$$

Arranging this formula with respect to the image signal components $Y_{k-1}$, $Y_k$, $Y_{k+1}$, and $Y_{k+2}$ yields Formula (46).

$$Y_p = \{-(\beta + 1/2)t^3 + (3\beta/2 + 1)t^2 - (1/2)t - \beta/2\}Y_{k-1} +$$
$$\{3(\beta + 1/2)t^3 - (9\beta/2 + 5/2)t^2 + \beta + 1\}Y_k +$$
$$\{-3(\beta + 1/2)t^3 + (9\beta/2 + 2)t^2 + (1/2)t - \beta/2\}Y_{k+1} +$$
$$\{(\beta + 1/2)t^3 - (3\beta/2 + 1/2)t^2\}Y_{k+2}$$

The interpolation coefficients $a_{k-1}$, $a_k$, $a_{k+1}$, and $a_{k+2}$ corresponding to the original image signal components $Y_{k-1}$, $Y_k$, $Y_{k+1}$, and $Y_{k+2}$ are calculated with the algorithms described above.

In such cases, the interpolation coefficient operation means 133 calculates the interpolation coefficients $a_{k-1}$, $a_k$, $a_{k+1}$, and $a_{k+2}$ in accordance with the parameter $\beta$, the calculation being carried out from the interpolation coefficients, which are stored in the storage means 131, and the parameter $\beta$ inputted from the input means 132. The interpolating operation means 134 calculates the value of the interpolated image signal component $Y_p$, which corresponds to the interpolation point $X_p$, with Formula (6) in accordance with the interpolation coefficients $a_{k-1}$, $a_k$, $a_{k+1}$, and $a_{k+2}$ according to the parameter $\beta$, which have been calculated by the interpolation coefficient operation means 133, and the original image signal components $Y_{k-1}$, $Y_k$, $Y_{k+1}$, and $Y_{k+2}$.

Figures 9A, 9B, 9C:
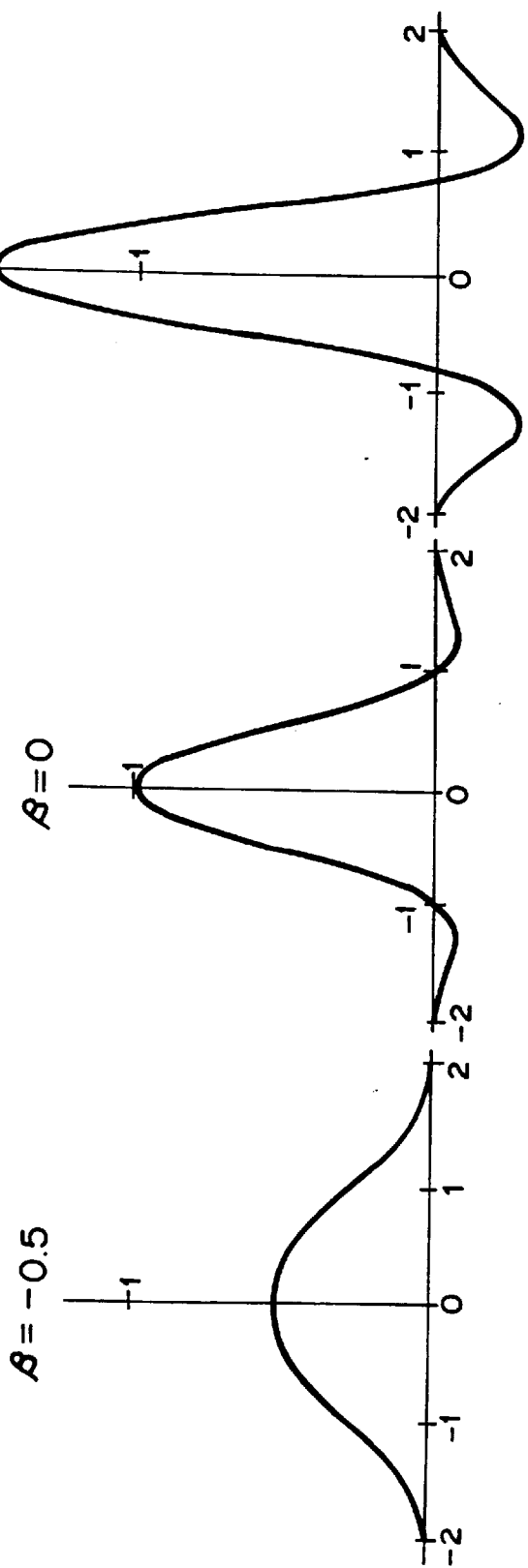
FIGS. 9A, 9B, and 9C are graphs showing interpolation coefficients obtained when the value of a parameter β is set to be equal to −0.5, 0, and 0.5, respectively.

FIGS. 9A, 9B, and 9C show the graphs of the interpolation coefficients obtained when the value of the parameter $\beta$ is set to be equal to −0.5, 0, and 0.5, respectively. As will be understood from FIGS. 9A, 9B, and 9C, as the value of the parameter $\beta$ is set to be larger, the contrast of the secondary image becomes higher, and an image having a higher sharpness is obtained. As the value of the parameter $\beta$ is set to be smaller, the contrast of the secondary image becomes lower, and a smoother image having a lower sharpness is obtained.

As the interpolation coefficients $a_{k-1}$, $a_k$, $a_{k+1}$, and $a_{k+2}$ stored in the storage means 131, those obtained from combinations of the aforesaid parameters $\alpha$ and $\beta$ may be employed. Specifically, the mean value of the values of Formulas (13) and (21), which is calculated with Formula (25), may be employed as the interpolation coefficient $a_{k-1}$. The mean value of the values of Formulas (14) and (22), which is calculated with Formula (26), may be employed as the interpolation coefficient $a_k$. The mean value of the values of Formulas (15) and (23), which is calculated with Formula (27), may be employed as the interpolation coefficient $a_{k+1}$. Also, the mean value of the values of Formulas (16) and (24), which is calculated with Formula (28), may be employed as the interpolation coefficient $a_{k+2}$.

$$a_{k-1} = -\{(\alpha+2\beta+1)/4\}t^3 + \{(2\alpha+3\beta+2)/4\}t^2 - \{(\alpha+1)/4\}t - \beta/4 \quad (25)$$

$$a_k = \{(\alpha+6\beta+7)/4\}t^3 + \{(\alpha-9\beta-11)/4\}t^2 + \beta/2 + 1 \quad (26)$$

$$a_{k+1} = \{(\alpha-6\beta-7)/4\}t^3 + \{(-2\alpha+9\beta+10)/4\}t^2 + \{(\alpha+1)/4\}t - \beta/4 \quad (27)$$

$$a_{k+2} = \{(\alpha+2\beta+1)/4\}t^3 - \{(\alpha+3\beta+1)/4\}t^2 \quad (28)$$

In such cases, the interpolation coefficient operation means 133 calculates the interpolation coefficients $a_{k-1}$, $a_k$, $a_{k+1}$, and $a_{k+2}$ in accordance with the parameters $\alpha$ and $\beta$, the calculation being carried out from the interpolation coefficients, which are stored in the storage means 131, and the parameters $\alpha$ and $\beta$ inputted from the input means 132. The interpolating operation means 134 calculates the value of the interpolated image signal component $Y_p$, which corresponds to the interpolation point $X_p$, with Formula (6) in accordance with the interpolation coefficients $a_{k-1}$, $a_k$, $a_{k+1}$, and $a_{k+2}$ according to the parameters $\alpha$ and $\beta$, which have been calculated by the interpolation coefficient operation means 133, and the original image signal components $Y_{k-1}$, $Y_k$, $Y_{k+1}$, and $Y_{k+2}$.

FIGS. 10A, 10B, and 10C are graphs showing interpolation coefficients obtained when the values of the parameters ($\alpha$, $\beta$) are set to be equal to (0.4, −0.5), (1.0, 0.0), and (1.6, 0.5), respectively. As will be understood from FIGS. 10A, 10B, and 10C, as the value of the parameter $\alpha$ is set to be larger, or as the value of the parameter $\beta$ is set to be larger, the contrast of the secondary image becomes higher, and an image having a higher sharpness is obtained. As the value of the parameter $\alpha$ is set to be smaller, or as the value of the parameter $\beta$ is set to be smaller, the contrast of the secondary image becomes lower, and a smoother image having a lower sharpness is obtained.

What is claimed is:

1. A spline interpolating operation method for an image signal, wherein an interpolating operation using a third-order spline interpolating function is carried out on an original image signal, which represents an original image and is made up of a series of original image signal components, and an interpolation image signal is obtained with Formula (6), said interpolation image signal being made up of a series of image signal components, which occur at intervals different from those of the original image signal components, $$Y_p = a_{k-1}Y_{k-1} + a_k Y_k + a_{k+1}Y_{k+1} + a_{k+2}Y_{k+2} \quad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the method comprising the steps of:
  i) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+2}$ such that, in cases where the original image signal components representing the two picture elements $X_{k-1}$ and $X_k$ located before the interpolation point $X_p$, which is located between the picture elements $X_k$ and $X_{k+1}$ in the original image, are represented by $Y_{k-1}$ and $Y_k$, the original image signal components representing the two picture elements $X_{k+1}$ and $X_{k+2}$ located after the interpolation point $X_p$ are represented by $Y_{k+1}$ and $Y_{k+2}$, the third-order spline interpolating function between the picture elements $X_k$ and $X_{k+1}$ is represented by $f_k$, the third-order spline interpolating function between the picture elements $X_{k-1}$ and $X_k$ is represented by $f_{k-1}$, and the third-order spline interpolating function between the picture elements $X_{k+1}$ and $X_{k+2}$ is represented by $f_{k+1}$:
    a) the spline interpolating function $f_k$ at the picture elements $X_k$ and $X_{k+1}$ may satisfy the original image signal components $Y_k$ and $Y_{k+1}$, as represented by Formulas (7) and (8):

$$f_k(X_k) = Y_k \quad (7)$$

$$f_k(X_{k+1}) = Y_{k+1} \quad (8)$$

b) the first-order differential coefficient of the spline interpolating function $f_k$ at the picture element $X_k$ may coincide with the first-order differential coefficient of the spline interpolating function $f_{k-1}$ at the picture element $X_k$, as represented by Formula (9):

$$f_k'(X_k) = f_{k-1}'(X_k) \qquad (9)$$

c) the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (10):

$$f_k'(X_{k+1}) = f_{k+1}'(X_{k+1}) \qquad (10)$$

d) the first-order differential coefficient of the spline interpolating function $f_k$ at the picture element $X_k$ may have an inclination of an arbitrary parameter $\alpha$ with respect to the gradient of the original image signal components $Y_{k-1}$ and $Y_{k+1}$ representing the picture elements $X_{k-1}$ and $X_{k+1}$, which are located before and after the picture element $X_k$, as represented by Formula (11), the arbitrary parameter $\alpha$ being selected previously and determining the sharpness of a secondary image represented by the interpolation image signal, $$f_k'(X_k) = \alpha(Y_{k+1} - Y_{k-1})/(X_{k+1} - X_{k-1}) \qquad (11)$$

and e) the first-order differential coefficient of the spline interpolating function $f_k$ at the picture element $X_{k+1}$ may have an inclination of said parameter $\alpha$ with respect to the gradient of the original image signal components $Y_k$ and $Y_{k+2}$ representing the picture elements $X_k$ and $X_{k+2}$, which are located before and after the picture element $X_{k+1}$, as represented by Formula (12):

$$f_k'(X_{k+1}) = \alpha(Y_{k+2} - Y_k)/(X_{k+2} - X_k) \qquad (12)$$

and ii) calculating the interpolated image signal component $Y_p$ corresponding to the interpolation point $X_p$ in accordance with the calculated interpolation coefficients $a_{k-1}$, $a_k$, $a_{k+1}$, and $a_{k+2}$, and the original image signal components $Y_{k-1}$, $Y_k$, $Y_{k+1}$, and $Y_{k+2}$.

2. A spline interpolating operation method for an image signal as defined in claim 1 wherein the calculated interpolation coefficients $a_{k-1}$, $a_k$, $a_{k+1}$, and $a_{k+2}$ are respectively represented by Formulas (13), (14), (15), and (16):

$$a_{k-1} = -(\alpha/2)t(t-1)^2 \qquad (13)$$

$$a_k = (2-\alpha/2)t^3 - (3-\alpha/2)t^2 + 1 \qquad (14)$$

$$a_{k+1} = (\alpha/2 - 2)t^3 + (3-\alpha)t^2 + (\alpha/2)t \qquad (15)$$

$$a_{k+2} = (\alpha/2)t^2(t-1) \qquad (16)$$

in which t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1.

3. A spline interpolating operation method for an image signal as defined in claim 1 wherein the original image is a radiation image.

4. A spline interpolating operation method for an image signal as defined in claim 3 wherein the radiation image has been stored on a stimulable phosphor sheet.

5. A spline interpolating operation method for an image signal as defined in claim 4 wherein the original image signal representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

6. A spline interpolating operation method for an image signal as defined in claim 1 wherein the original image has been recorded on photographic film.

7. A spline interpolating operation method for an image signal, wherein an interpolating operation using a third-order spline interpolating function is carried out on an original image signal, which represents an original image and is made up of a series of original image signal components, and an interpolation image signal is obtained with Formula (6), said interpolation image signal being made up of a series of image signal components, which occur at intervals different from those of the original image signal components, $$Y_p = a_{k-1}Y_{k-1} + a_k Y_k + a_{k+1}Y_{k+1} + a_{k+2}Y_{k+2} \qquad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the method comprising the steps of:

i) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+2}$ such that, in cases where the original image signal components representing the two picture elements $X_{k-1}$ and $X_k$ located before the interpolation point $X_p$, which is located between the picture elements $X_k$ and $X_{k+1}$ in the original image, are represented by $Y_{k-1}$ and $Y_k$, the original image signal components representing the two picture elements $X_{k+1}$ and $X_{k+2}$ located after the interpolation point $X_p$ are represented by $Y_{k+1}$ and $Y_{k+2}$, the third-order spline interpolating function between the picture elements $X_k$ and $X_{k+1}$ is represented by $f_k$, the third-order spline interpolating function between the picture elements $X_{k-1}$ and $X_k$ is represented by $f_{k-1}$, and the third-order spline interpolating function between the picture elements $X_{k+1}$ and $X_{k+2}$ is represented by $f_{k+1}$:

a) the spline interpolating function $f_k$ at the picture elements $X_k$ and $X_{k+1}$ may slightly deviate from the original image signal components $Y_k$ and $Y_{k+1}$ in accordance with an arbitrary parameter $\beta$, as represented by Formulas (17) and (18), the arbitrary parameter $\beta$ being selected previously and determining the sharpness of a secondary image represented by the interpolation image signal, $$f_k(X_k) = -0.5\beta Y_{k-1} + (1+\beta)Y_k - 0.5\beta Y_{k+1} \qquad (17)$$

$$f_k(X_{k+1}) = -0.5\beta Y_k + (1+\beta)Y_{k+1} - 0.5\beta Y_{k+2} \qquad (18)$$

b) the first-order differential coefficient of the spline interpolating function $f_k$ at the picture element $X_k$ may coincide with the first-order differential coefficient of the spline interpolating function $f_{k-1}$, at the picture element $X_k$, as represented by Formula (9):

$$f_k'(X_k)=f_{k-1}'(X_k) \qquad (9)$$

c) the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (10):

$$f_k'(X_{k+1})=f_{k+1}'(X_{k+1}) \qquad (10)$$

d) the first-order differential coefficient of the spline interpolating function $f_k$ at the picture element $X_k$ may coincide with the gradient of the original image signal components $Y_{k-1}$ and $Y_{k+1}$ representing the picture elements $X_{k-1}$ and $X_{k+1}$, which are located before and after the picture element $X_k$, as represented by Formula (19):

$$f_k'(X_k)=(Y_{k+1}-Y_{k-1})/(X_{k+1}-X_{k-1}) \qquad (19)$$

and e) the first-order differential coefficient of the spline interpolating function $f_k$ at the picture element $X_{k+1}$ may coincide with the gradient of the original image signal components $Y_k$ and $Y_{k+2}$ representing the picture elements $X_k$ and $X_{k+2}$, which are located before and after the picture element $X_{k+1}$, as represented by Formula (20):

$$f_k'(X_{k+1})=(Y_{k+2}-Y_k)/(X_{k+2}-X_k) \qquad (20)$$

and ii) calculating the interpolated image signal component $Y_p$ corresponding to the interpolation point $X_p$ in accordance with the calculated interpolation coefficients $a_{k-1}$, $a_k$, $a_{k+1}$, and $a_{k+2}$, and the original image signal components $Y_{k-1}$, $Y_k$, $Y_{k+1}$, and $Y_{k+2}$.

8. A spline interpolating operation method for an image signal as defined in claim 7 wherein the calculated interpolation coefficients $a_{k-1}$, $a_k$, $a_{k+1}$, and $a_{k+2}$ are respectively represented by Formulas (21), (22), (23), and (24):

$$a_{k-1}=-(\beta+1/2)t^3+(3\beta/2+1)t^2-(1/2)t-\beta/2 \qquad (21)$$

$$a_k=3(\beta+1/2)t^3-(9\beta/2+5/2)t^2+\beta+1 \qquad (22)$$

$$a_{k+1}=-3(\beta+1/2)t^3+(9\beta/2+2)t^2+(1/2)t-\beta/2 \qquad (23)$$

$$a_{k+2}=(\beta+1/2)t^3-(3\beta/2+1/2)t^2 \qquad (24)$$

in which t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1.

9. A spline interpolating operation method for an image signal as defined in claim 7 wherein the original image is a radiation image.

10. A spline interpolating operation method for an image signal as defined in claim 9 wherein the radiation image has been stored on a stimulable phosphor sheet.

11. A spline interpolating operation method for an image signal as defined in claim 10 wherein the original image signal representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

12. A spline interpolating operation method for an image signal as defined in claim 7 wherein the original image has been recorded on photographic film.

13. A spline interpolating operation method for an image signal, wherein an interpolating operation using a third-order spline interpolating function is carried out on an original image signal, which represents an original image and is made up of a series of original image signal components, and an interpolation image signal is obtained with Formula (6), said interpolation image signal being made up of a series of image signal components, which occur at intervals different from those of the original image signal components, $$Y_p=a_{k-1}Y_{k-1}+a_kY_k+a_{k+1}Y_{k+1}+a_{k+2}Y_{k+2} \qquad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the method comprising the steps of:

i) calculating the interpolation coefficients $a_{k-1}$, $a_k$, $a_{k+1}$, and $a_{k+2}$ respectively corresponding to the original image signal components $Y_{k-1}$, $Y_k$, $Y_{k+1}$, and $Y_{k+2}$ such that, in cases where the original image signal components representing the two picture elements $X_{k-1}$ and $X_k$ located before the interpolation point $X_p$, which is located between the picture elements $X_k$ and $X_{k+1}$ in the original image, are represented by $Y_{k-1}$, and $Y_k$, the original image signal components representing the two picture elements $X_{k+1}$ and $X_{k+2}$ located after the interpolation point $X_p$ are represented by $Y_{k+1}$ and $Y_{k+2}$, the third-order spline interpolating function between the picture elements $X_k$ and $X_{k+1}$ is represented by $f_k$, the third-order spline interpolating function between the picture elements $X_{k-1}$ and $X_k$ is represented by $f_{k-1}$, and the third-order spline interpolating function between the picture elements $X_{k+1}$ and $X_{k+2}$ is represented by $f_{k+1}$:

a) the spline interpolating function $f_k$ at the picture elements $X_k$ and $X_{k+1}$ may satisfy the original image signal components $Y_k$ and $Y_{k+1}$, as represented by Formulas (7) and (8):

$$f_k(X_k)=Y_k \qquad (7)$$

$$f_k(X_{k+1})=Y_{k+1} \qquad (8)$$

b) the first-order differential coefficient of the spline interpolating function $f_k$ at the picture element $X_{k+1}$ may coincide with the first-order differential coefficient of the spline interpolating function $f_{k-1}$ at the picture element $X_k$, as represented by Formula (9):

$$f_k'(X_k)=f_{k-1}'(X_k) \qquad (9)$$

c) the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (10):

$$f_k'(X_{k+1}) = f_{k+1}'(X_{k+1}) \quad (10)$$

d) the first-order differential coefficient of the spline interpolating function $f_k$ at the picture element $X_k$ may have an inclination of an arbitrary parameter $\alpha$ with respect to the gradient of the original image signal components $Y_{k-1}$ and $Y_{k+1}$ representing the picture elements $X_{k-1}$ and $X_{k+1}$, which are located before and after the picture element $X_k$, as represented by Formula (11), the arbitrary parameter $\alpha$ being selected previously and determining the sharpness of a secondary image represented by the interpolation image signal, $$f_k'(X_k) = \alpha(Y_{k+1} - Y_{k-1})/(X_{k+1} - X_{k-1}) \quad (11)$$

and e) the first-order differential coefficient of the spline interpolating function $f_k$ at the picture element $X_{k+1}$ may have an inclination of said parameter $\alpha$ with respect to the gradient of the original image signal components $Y_k$ and $Y_{k+2}$ representing the picture elements $X_k$ and $X_{k+2}$, which are located before and after the picture element $X_{k+1}$, as represented by Formula (12):

$$f_k'(X_{k+1}) = \alpha(Y_{k+2} - Y_k)/(X_{k+2} - X_k) \quad (12)$$

ii) calculating interpolation coefficients $b_{k-1}$, $b_k$, $b_{k+1}$, and $b_{k+2}$ respectively corresponding to the original image signal components $Y_{k-1}$, $Y_k$, $Y_{k+1}$, and $Y_{k+2}$ such that:

f) the spline interpolating function $f_k$ at the picture elements $X_k$ and $X_{k+1}$ may slightly deviate from the original image signal components $Y_k$ and $Y_{k+1}$ in accordance with an arbitrary parameter $\beta$, as represented by Formulas (17) and (18), the arbitrary parameter $\beta$ being selected previously and determining the sharpness of the secondary image represented by the interpolation image signal, $$f_k(X_k) = -0.5\beta Y_{k-1} + (1+\beta)Y_k - 0.5\beta Y_{k+1} \quad (17)$$

$$f_k(X_{k+1}) = -0.5\beta Y_k + (1+\beta)Y_{k+1} - 0.5\beta Y_{k+2} \quad (18)$$

g) the first-order differential coefficient of the spline interpolating function $f_k$ at the picture element $X_k$ may coincide with the first-order differential coefficient of the spline interpolating function $f_{k-1}$, at the picture element $X_k$, as represented by Formula (9):

$$f_k'(X_k) = f_{k-1}'(X_k) \quad (9)$$

h) the first-order differential coefficient of the spline interpolating function $f_k$ at the picture element $X_{k+1}$ may coincide with the first-order differential coefficient of the spline interpolating function $f_{k+1}$ at the picture element $X_{k+1}$, as represented by Formula (10):

$$f_k'(X_{k+1}) = f_{k+1}'(X_{k+1}) \quad (10)$$

i) the first-order differential coefficient of the spline interpolating function $f_k$ at the picture element $X_k$ may coincide with the gradient of the original image signal components $Y_{k-1}$ and $Y_{k+1}$ representing the picture elements $X_{k-1}$ and $X_{k+1}$, which are located before and after the picture element $X_k$, as represented by Formula (19):

$$f_k'(X_k) = (Y_{k+1} - Y_{k-1})/(X_{k+1} - X_{k-1}) \quad (19)$$

j) the first-order differential coefficient of the spline interpolating function $f_k$ at the picture element $X_{k+1}$ may coincide with the gradient of the original image signal components $Y_k$ and $Y_{k+2}$ representing the picture elements $X_k$ and $X_{k+2}$, which are located before and after the picture element $X_{k+1}$, as represented by Formula (20):

$$f_k'(X_{k+1}) = (Y_{k+2} - Y_k)/(X_{k+2} - X_k) \quad (20)$$

iii) calculating a mean value of the set of the interpolation coefficients $a_{k-1}$, and $b_{k-1}$, a mean value of the set of the interpolation coefficients $a_k$ and $b_k$, a mean value of the set of the interpolation coefficients $a_{k+1}$ and $b_{k+1}$, and a mean value of the set of the interpolation coefficients $a_{k+2}$ and $b_{k+2}$, which sets respectively correspond to the original image signal components $Y_{k-1}$, $Y_k$, $Y_{k+1}$, and $Y_{k+2}$, the calculated mean values being taken as the values of new interpolation coefficients $a_{k-1}$, $a_k$, $a_{k+1}$, and $a_{k+2}$, and iv) calculating the interpolated image signal component $Y_p$ corresponding to the interpolation point $X_p$ in accordance with the calculated new interpolation coefficients $a_{k-1}$, $a_k$, $a_{k+1}$, and $a_{k+2}$, and the original image signal components $Y_{k-1}$, $Y_k$, $Y_{k+1}$, and $Y_{k+2}$.

14. A spline interpolating operation method for an image signal in as defined in claim 13 wherein the calculated new interpolation coefficients $a_{k-1}$, $a_k$, $a_{k+1}$, and $a_{k+2}$, which represent the mean values, are respectively represented by Formulas (25), (26), (27), and (28):

$$a_{k-1} = -\{(\alpha+2\beta+1)/4\}t^3 + \{(2\alpha+3\beta+2)/4\}t^2 - \{(\alpha+1)/4\}t - \beta/4 \quad (25)$$

$$a_k = \{(\alpha+6\beta+7)/4\}t^3 + \{(\alpha-9\beta-11)/4\}t^2 + \beta/2 + 1 \quad (26)$$

$$a_{k+1} = \{(\alpha-6\beta-7)/4\}t^3 + \{(-2\alpha+9\beta+10)/4\}t^2 + \{(\alpha+1)/4\}t - \beta/4 \quad (27)$$

$$a_{k+2} = \{(\alpha+2\beta+1)/4\}t^3 - \{(\alpha+3\beta+1)/4\}t^2 \quad (28)$$

in which t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1.

15. A spline interpolating operation method for an image signal as defined in claim 13 wherein the original image is a radiation image.

16. A spline interpolating operation method for an image signal as defined in claim 15 wherein the radiation image has been stored on a stimulable phosphor sheet.

17. A spline interpolating operation method for an image signal as defined in claim 16 wherein the original image signal representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

18. A spline interpolating operation method for an image signal as defined in claim 13 wherein the original image has been recorded on photographic film.

19. A spline interpolating operation apparatus for an image signal, wherein an interpolating operation using a third-order spline interpolating function is carried out on an original image signal, which represents an original image and is made up of a series of original image signal components, and an interpolation image signal is obtained with Formula (6), said interpolation image signal being made up of a series of image signal components, which occur at intervals different from those of the original image signal components, $$Y_p = a_{k-1}Y_{k-1} + a_k Y_k + a_{k+1}Y_{k+1} + a_{k+2}Y_{k+2} \qquad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the apparatus comprising:
1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $X_{k-1}$, $X_k$, $X_{k+1}$, and $X_{k+2}$ in the original image, and which are set to be respectively represented by Formulas (13), (14), (15), and (16):

$$a_{k-1} = -(\alpha/2)t(t-1)^2 \qquad (13)$$

$$a_k = (2-\alpha/2)t^3 - (3-\alpha/2)t^2 + 1 \qquad (14)$$

$$a_{k+1} = (\alpha/2-2)t^3 + (3-\alpha)t^2 + (\alpha/2)t \qquad (15)$$

$$a_{k+2} = (\alpha/2)t^2(t-1) \qquad (16)$$

in which α represents the parameter determining the sharpness of a secondary image represented by the interpolation image signal, and t, where 0≦t<1, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameter α, which determines the sharpness of the secondary image reproduced from the interpolation image signal,
3) an interpolation coefficient operation means for calculating the interpolation coefficients $a_{k-1}$, $a_k$, $a_{k+1}$, and $a_{k+2}$ in accordance with the parameter α, the calculation being carried out from the interpolation coefficients, which are stored in said storage means, and the parameter α inputted from said input means, and
4) an interpolating operation means for storing Formula (6) as the operation formula, and calculating the value of the interpolated image signal component $Y_p$, which corresponds to the interpolation point $X_p$, with Formula (6) in accordance with the interpolation coefficients $a_{k-1}$, $a_k$, $a_{k+1}$, and $a_{k+2}$, which have been calculated by said interpolation coefficient operation means, and the original image signal components $Y_{k-1}$, $Y_k$, $Y_{k+1}$, and $Y_{k+2}$.

20. A spline interpolating operation apparatus for an image signal as defined in claim 19 wherein the original image is a radiation image.

21. A spline interpolating operation apparatus for an image signal as defined in claim 20 wherein the radiation image has been stored on a stimulable phosphor sheet.

22. A spline interpolating operation apparatus for an image signal as defined in claim 21 wherein the original image signal representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

23. A spline interpolating operation apparatus for an image signal as defined in claim 19 wherein the original image has been recorded on photographic film.

24. A spline interpolating operation apparatus for an image signal, wherein an interpolating operation using a third-order spline interpolating function is carried out on an original image signal, which represents an original image and is made up of a series of original image signal components, and an interpolation image signal is obtained with Formula (6), said interpolation image signal being made up of a series of image signal components, which occur at intervals different from those of the original image signal components, $$Y_p = a_{k-1}Y_{k-1} + a_k Y_k + a_{k+1}Y_{k+1} + a_{k+2}Y_{k+2} \qquad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the apparatus comprising:
1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $X_{k-1}$, $X_k$, $X_{k+1}$, and $X_{k+2}$ in the original image, and which are set to be respectively represented by Formulas (21), (22), (23), and (24):

$$a_{k-1} = -(\beta+1/2)t^3 + (3\beta/2+1)t^2 - (1/2)t - \beta/2 \qquad (21)$$

$$a_k = 3(\beta+1/2)t^3 - (9\beta/2+5/2)t^2 + \beta + 1 \qquad (22)$$

$$a_{k+1} = -3(\beta+1/2)t^3 + (9\beta/2+2)t^2 + (1/2)t - \beta/2 \qquad (23)$$

$$a_{k+2} = (\beta+1/2)t^3 - (3\beta/2+1/2)t^2 \qquad (24)$$

in which β represents the parameter determining the sharpness of a secondary image represented by the interpolation image signal, and t, where 0≦t<1, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameter β, which determines the sharpness of the secondary image reproduced from the interpolation image signal,
3) an interpolation coefficient operation means for calculating the interpolation coefficients $a_{k-1}$, $a_k$, $a_{k+1}$, and $a_{k+2}$ in accordance with the parameter β, the calculation being carried out from the interpolation coefficients, which are stored in said storage means, and the parameter β inputted from said input means, and 4) an interpolating operation means for storing Formula (6) as the operation formula, and calculating the value of the interpolated image signal component $Y_p$, which corresponds to the interpolation point $X_p$, with Formula (6) in accordance with the interpolation coefficients $a_{k-1}$, $a_k$, $a_{k+1}$, and $a_{k+2}$, which have been calculated by said interpolation coefficient operation means, and the original image signal components $Y_{k-1}$, $Y_k$, $Y_{k+1}$, and $Y_{k+2}$.

25. A spline interpolating operation apparatus for an image signal as defined in claim 24 wherein the original image is a radiation image.

26. A spline interpolating operation apparatus for an image signal as defined in claim 25 wherein the radiation image has been stored on a stimulable phosphor sheet.

27. A spline interpolating operation apparatus for an image signal as defined in claim 26 wherein the original image signal representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

28. A spline interpolating operation apparatus for an image signal as defined in claim 24 wherein the original image has been recorded on photographic film.

29. A spline interpolating operation apparatus for an image signal, wherein an interpolating operation using a third-order spline interpolating function is carried out on an original image signal, which represents an original image and is made up of a series of original image signal components, and an interpolation image signal is obtained with Formula (6), said interpolation image signal being made up of a series of image signal components, which occur at intervals different from those of the original image signal components, $$Y_p = a_{k-1}Y_{k-1} + a_k Y_k + a_{k+1}Y_{k+1} + a_{k+2}Y_{k+2} \quad (6)$$

in which $Y_{k-1}$, $Y_k$, $Y_{k+1}$, and $Y_{k+2}$ represent the original image signal components representing picture elements $X_{k-1}$, $X_k$, $X_{k+1}$, and $X_{k+2}$ in the original image, $Y_p$ represents the interpolated image signal component corresponding to an interpolation point $X_p$ located between the picture elements $X_k$ and $X_{k+1}$, and $a_{k-1}$, $a_k$, $a_{k+1}$, and $a_{k+2}$ represent the interpolation coefficients, the apparatus comprising:

1) a storage means for storing information representing the interpolation coefficients $a_{k-1}$, $a_k$, $a_{k+1}$, and $a_{k+2}$, which respectively correspond to the original image signal components $Y_{k-1}$, $Y_k$, $Y_{k+1}$, and $Y_{k+2}$ representing the picture elements $X_{k-1}$, $X_k$, $X_{k+1}$, and $X_{k+2}$ in the original image, and which are set to be respectively represented by Formulas (25), (26), (27), and (28):

$$a_{k-1} = -\{(\alpha+2\beta+1)/4\}t^3 + \{(2\alpha+3\beta+2)/4\}t^2 - \{(\alpha+1)/4\}t - \beta/4 \quad (25)$$

$$a_k = \{(\alpha+6\beta+7)/4\}t^3 + \{(\alpha-9\beta-11)/4\}t^2 + \beta/2 + 1 \quad (26)$$

$$a_{k+1} = \{(\alpha-6\beta-7)/4\}t^3 + \{(-2\alpha+9\beta+10)/4\}t^2 + \{(\alpha+1)/4\}t - \beta/4 \quad (27)$$

$$a_{k+2} = \{(\alpha+2\beta+1)/4\}t^3 - \{(\alpha+3\beta+1)/4\}t^2 \quad (28)$$

in which $\alpha$ and $\beta$ represent the parameters determining the sharpness of a secondary image represented by the interpolation image signal, and t, where $0 \leq t < 1$, represents the position of the interpolation point $X_p$, the position being taken with respect to the picture element $X_k$, that serves as a reference position, and in the direction heading toward the picture element $X_{k+1}$, the lattice interval of the original image signal components being set to be equal to 1, 2) an input means for inputting the arbitrary parameters $\alpha$ and $\beta$, which determine the sharpness of the secondary image reproduced from the interpolation image signal, 3) an interpolation coefficient operation means for calculating the interpolation coefficients $a_{k-1}$, $a_k$, $a_{k+1}$, and $a_{k+2}$ in accordance with the parameters $\alpha$ and $\beta$, the calculation being carried out from the interpolation coefficients, which are stored in said storage means, and the parameters $\alpha$ and $\beta$ inputted from said input means, and 4) an interpolating operation means for storing Formula (6) as the operation formula, and calculating the value of the interpolated image signal component $Y_p$, which corresponds to the interpolation point $X_p$, with Formula (6) in accordance with the interpolation coefficients $a_{k-1}$, $a_k$, $a_{k+1}$, and $a_{k+2}$, which have been calculated by said interpolation coefficient operation means, and the original image signal components $Y_{k-1}$, $Y_k$, $Y_{k+1}$, and $Y_{k+2}$.

30. A spline interpolating operation apparatus for an image signal as defined in claim 29 wherein the original image is a radiation image.

31. A spline interpolating operation apparatus for an image signal as defined in claim 30 wherein the radiation image has been stored on a stimulable phosphor sheet.

32. A spline interpolating operation apparatus for an image signal as defined in claim 31 wherein the original image signal representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

33. A spline interpolating operation apparatus for an image signal as defined in claim 29 wherein the original image has been recorded on photographic film.

\* \* \* \* \*